(12) United States Patent
Cape et al.

(10) Patent No.: US 9,873,281 B2
(45) Date of Patent: Jan. 23, 2018

(54) SINGLE LAYER IMAGE PROJECTION FILM

(71) Applicant: Visual Physics, LLC, Alpharetta, GA (US)

(72) Inventors: Samuel M. Cape, Woodstock, GA (US); Richard A. Steenblik, Princeville, HI (US); Gregory R. Jordan, Cumming, GA (US)

(73) Assignee: Visual Physics, LLC, Alpharetta, GA (US)

( * ) Notice: Subject to any disclaimer, the term of this patent is extended or adjusted under 35 U.S.C. 154(b) by 0 days.

(21) Appl. No.: 14/975,048

(22) Filed: Dec. 18, 2015

(65) Prior Publication Data

US 2016/0101643 A1  Apr. 14, 2016

Related U.S. Application Data

(63) Continuation-in-part of application No. 14/304,330, filed on Jun. 13, 2014, now abandoned.
(Continued)

(51) Int. Cl.
*G02B 27/10* (2006.01)
*B42D 25/342* (2014.01)
(Continued)

(52) U.S. Cl.
CPC ......... *B42D 25/342* (2014.10); *B42D 25/324* (2014.10); *B42D 25/351* (2014.10);
(Continued)

(58) Field of Classification Search
USPC .................................................. 359/619–630
See application file for complete search history.

(56) References Cited

U.S. PATENT DOCUMENTS

| 992,151 A | 5/1911 | Berthon |
| 1,824,353 A | 9/1931 | Jensen |

(Continued)

FOREIGN PATENT DOCUMENTS

| AU | 2009278275 | 7/2012 |
| CA | 2741298 | 4/2010 |

(Continued)

OTHER PUBLICATIONS

Article: "Sphericalh Lenses" (Jan. 18, 2009); pp. 1-12; retrieved from the Internet: URL:http://www.physicsinsights.org/simple_optics_spherical_lenses-1.html.
(Continued)

*Primary Examiner* — Mohammed Hasan
(74) *Attorney, Agent, or Firm* — Holland & Bonzagni, PC; Mary R. Bonzagni, Esq.

(57) ABSTRACT

A single layer image projection system that is made up of an arrangement of optionally reflective arcuate elements having an upper arcuate surface, a lower surface, and an arcuate area bounded by the upper arcuate and lower surfaces, and an optionally reflective pattern of image relief microstructures disposed on or within at least some of the upper arcuate surfaces of the arcuate elements, is provided. The arrangement of optionally reflective arcuate elements and the optionally reflective pattern of image relief microstructures are in a single layer and interact to project one or more images. For an upper arcuate surface with convex surface curvature, the image relief microstructures extend downwardly from this surface terminating within the arcuate area, and for an upper arcuate surface with concave surface curvature, the image relief microstructures extend upwardly from this surface terminating within an area defined by the curvature of the upper arcuate surface. Transmission of light
(Continued)

through the system, reflection of light from the system or a combination thereof forms one or more images.

41 Claims, 18 Drawing Sheets

Related U.S. Application Data

(60) Provisional application No. 61/834,762, filed on Jun. 13, 2013.

(51) Int. Cl.
- *G02B 5/09* (2006.01)
- *G02B 27/60* (2006.01)
- *G02B 3/00* (2006.01)
- *G02B 27/22* (2006.01)
- *B42D 25/324* (2014.01)
- *B42D 25/351* (2014.01)

(52) U.S. Cl.
CPC ......... *G02B 3/0006* (2013.01); *G02B 3/0043* (2013.01); *G02B 5/09* (2013.01); *G02B 27/2214* (2013.01); *G02B 27/60* (2013.01)

(56) References Cited

U.S. PATENT DOCUMENTS

| | | |
|---|---|---|
| 1,849,036 A | 3/1932 | Ernst |
| 1,942,841 A | 1/1934 | Shimizu |
| 2,268,351 A | 12/1941 | Tanaka |
| 2,355,902 A | 8/1944 | Berg |
| 2,432,896 A | 12/1947 | Hotchner |
| 2,888,855 A | 6/1959 | Tanaka |
| 2,992,103 A | 7/1961 | Land et al. |
| 3,122,853 A | 3/1964 | Koonz et al. |
| 3,241,429 A | 3/1966 | Rice et al. |
| 3,264,164 A | 8/1966 | Jerothe et al. |
| 3,312,006 A | 4/1967 | Rowland |
| 3,357,772 A | 12/1967 | Rowland |
| 3,357,773 A | 12/1967 | Rowland |
| 3,463,581 A | 8/1969 | Clay |
| 3,609,035 A | 9/1971 | Ataka |
| 3,643,361 A | 2/1972 | Eaves |
| 3,704,068 A | 11/1972 | Waly |
| 3,801,183 A | 4/1974 | Sevelin et al. |
| 3,811,213 A | 5/1974 | Eaves |
| 3,887,742 A | 6/1975 | Reinnagel |
| 4,025,673 A | 5/1977 | Reinnagel |
| 4,073,650 A | 2/1978 | Yevick |
| 4,082,426 A | 4/1978 | Brown |
| 4,185,191 A | 1/1980 | Stauffer |
| 4,345,833 A | 8/1982 | Siegmund |
| 4,417,784 A | 11/1983 | Knop et al. |
| 4,498,736 A | 2/1985 | Griffin |
| 4,507,349 A | 3/1985 | Fromson et al. |
| 4,519,632 A | 5/1985 | Parkinson et al. |
| 4,534,398 A | 8/1985 | Crane |
| 4,634,220 A | 1/1987 | Hockert et al. |
| 4,645,301 A | 2/1987 | Orensteen et al. |
| 4,662,651 A | 5/1987 | Mowry, Jr. |
| 4,688,894 A | 8/1987 | Hockert |
| 4,691,993 A | 9/1987 | Porter et al. |
| 4,756,972 A | 7/1988 | Kloosterboer et al. |
| 4,765,656 A | 8/1988 | Becker et al. |
| 4,814,594 A | 3/1989 | Drexler |
| 4,892,336 A | 1/1990 | Kaule et al. |
| 4,892,385 A | 1/1990 | Webster, Jr. et al. |
| 4,920,039 A | 4/1990 | Fotland et al. |
| 4,935,335 A | 6/1990 | Fotland |
| 4,988,126 A | 1/1991 | Heckenkamp et al. |
| 5,044,707 A | 9/1991 | Mallik |
| 5,074,649 A | 12/1991 | Hamanaka |
| 5,085,514 A | 2/1992 | Mallik et al. |
| 5,135,262 A | 8/1992 | Smith et al. |
| 5,142,383 A | 8/1992 | Mallik |
| 5,211,424 A | 5/1993 | Bliss |
| 5,215,864 A | 6/1993 | Laakmann |
| 5,232,764 A | 8/1993 | Oshima |
| 5,254,390 A | 10/1993 | Lu |
| 5,282,650 A | 2/1994 | Smith et al. |
| 5,359,454 A | 10/1994 | Steenblik et al. |
| 5,384,861 A | 1/1995 | Mattson et al. |
| 5,393,099 A | 2/1995 | D'Amato |
| 5,393,590 A | 2/1995 | Caspari |
| 5,413,839 A | 5/1995 | Chatwin et al. |
| 5,433,807 A | 7/1995 | Heckenkamp et al. |
| 5,438,928 A | 8/1995 | Chatwin et al. |
| 5,449,200 A | 9/1995 | Andric et al. |
| 5,460,679 A | 10/1995 | Abdel-Kader |
| 5,461,495 A | 10/1995 | Steenblik et al. |
| 5,464,690 A | 11/1995 | Boswell |
| 5,468,540 A | 11/1995 | Lu |
| 5,479,507 A | 12/1995 | Anderson |
| 5,492,370 A | 2/1996 | Chatwin et al. |
| 5,503,902 A | 4/1996 | Steenblik et al. |
| 5,538,753 A | 7/1996 | Antes et al. |
| 5,543,942 A | 8/1996 | Mizuguchi et al. |
| 5,555,476 A | 9/1996 | Suzuki et al. |
| 5,567,276 A | 10/1996 | Boehm et al. |
| 5,568,313 A | 10/1996 | Steenblik et al. |
| 5,574,083 A | 11/1996 | Brown et al. |
| 5,575,507 A | 11/1996 | Yamauchi et al. |
| 5,598,281 A | 1/1997 | Zimmerman et al. |
| 5,623,347 A | 4/1997 | Pizzanelli |
| 5,623,368 A | 4/1997 | Calderini et al. |
| 5,626,969 A | 5/1997 | Joson |
| 5,631,039 A | 5/1997 | Knight et al. |
| 5,639,126 A | 6/1997 | Dames et al. |
| 5,642,226 A | 6/1997 | Rosenthal |
| 5,643,678 A | 7/1997 | Boswell |
| 5,670,003 A | 9/1997 | Boswell |
| 5,670,096 A | 9/1997 | Lu |
| 5,674,580 A | 10/1997 | Boswell |
| 5,688,587 A | 11/1997 | Burchard et al. |
| 5,695,346 A | 12/1997 | Sekiguchi et al. |
| 5,712,731 A | 1/1998 | Drinkwater et al. |
| 5,723,200 A | 3/1998 | Oshima et al. |
| 5,731,064 A | 3/1998 | Süss |
| 5,737,126 A | 4/1998 | Lawandy |
| 5,753,349 A | 5/1998 | Boswell |
| 5,759,683 A | 6/1998 | Boswell |
| 5,763,349 A | 6/1998 | Zandona |
| 5,783,017 A | 7/1998 | Boswell |
| 5,783,275 A | 7/1998 | Mück et al. |
| 5,800,907 A | 9/1998 | Yumoto |
| 5,810,957 A | 9/1998 | Boswell |
| 5,812,313 A | 9/1998 | Johansen et al. |
| 5,886,798 A | 3/1999 | Staub et al. |
| 5,933,276 A | 8/1999 | Magee |
| 5,949,420 A | 9/1999 | Terlutter |
| 5,995,638 A | 11/1999 | Amidror et al. |
| 6,030,691 A | 2/2000 | Burchard et al. |
| 6,036,230 A | 3/2000 | Farber |
| 6,036,233 A | 3/2000 | Braun et al. |
| 6,060,143 A | 5/2000 | Tompkin et al. |
| 6,084,713 A | 7/2000 | Rosenthal |
| 6,089,614 A | 7/2000 | Howland et al. |
| 6,106,950 A | 8/2000 | Searle et al. |
| 6,176,582 B1 | 1/2001 | Grasnick |
| 6,177,953 B1 | 1/2001 | Vachette et al. |
| 6,179,338 B1 | 1/2001 | Bergmann et al. |
| 6,195,150 B1 | 2/2001 | Silverbrook |
| 6,256,149 B1 | 7/2001 | Rolfe |
| 6,256,150 B1 | 7/2001 | Rosenthal |
| 6,283,509 B1 | 9/2001 | Braun et al. |
| 6,288,842 B1 | 9/2001 | Florczak et al. |
| 6,297,911 B1 | 10/2001 | Nishikawa et al. |
| 6,301,363 B1 | 10/2001 | Mowry, Jr. |
| 6,302,989 B1 | 10/2001 | Kaule |
| 6,328,342 B1 | 12/2001 | Belousov et al. |
| 6,329,040 B1 | 12/2001 | Oshima et al. |
| 6,329,987 B1 | 12/2001 | Gottfried et al. |
| 6,345,104 B1 | 2/2002 | Rhoads |

(56) References Cited

U.S. PATENT DOCUMENTS

| | | | |
|---|---|---|---|
| 6,348,999 B1 | 2/2002 | Summersgill et al. |
| 6,350,036 B1 | 2/2002 | Hannington et al. |
| 6,369,947 B1 | 4/2002 | Staub et al. |
| 6,373,965 B1 | 4/2002 | Liang |
| 6,381,071 B1 | 4/2002 | Dona et al. |
| 6,404,555 B1 | 6/2002 | Nishikawa |
| 6,405,464 B1 | 6/2002 | Gulick, Jr. et al. |
| 6,414,794 B1 | 7/2002 | Rosenthal |
| 6,424,467 B1 | 7/2002 | Goggins |
| 6,433,844 B2 | 8/2002 | Li |
| 6,450,540 B1 | 9/2002 | Kim |
| 6,467,810 B2 | 10/2002 | Taylor et al. |
| 6,473,238 B1 | 10/2002 | Daniell |
| 6,483,644 B1 | 11/2002 | Gottfried et al. |
| 6,500,526 B1 | 12/2002 | Hannington |
| 6,521,324 B1 | 2/2003 | Debe et al. |
| 6,542,646 B1 | 4/2003 | Bar-Yona |
| 6,558,009 B2 | 5/2003 | Hannington et al. |
| 6,587,276 B2 | 7/2003 | Daniell |
| 6,616,803 B1 | 9/2003 | Isherwood et al. |
| 6,618,201 B2 | 9/2003 | Nishikawa et al. |
| 6,641,270 B2 | 11/2003 | Hannington et al. |
| 6,671,095 B2 | 12/2003 | Summersgill et al. |
| 6,712,399 B1 | 3/2004 | Drinkwater et al. |
| 6,721,101 B2 | 4/2004 | Daniell |
| 6,724,536 B2 | 4/2004 | Magee |
| 6,726,858 B2 | 4/2004 | Andrews |
| 6,751,024 B1 | 6/2004 | Rosenthal |
| 6,761,377 B2 | 7/2004 | Taylor et al. |
| 6,795,250 B2 | 9/2004 | Johnson et al. |
| 6,803,088 B2 | 10/2004 | Kaminsky et al. |
| 6,819,775 B2 | 11/2004 | Amidror et al. |
| 6,833,960 B1 | 12/2004 | Scarbrough et al. |
| 6,856,462 B1 | 2/2005 | Scarbrough et al. |
| 6,870,681 B1 | 3/2005 | Magee |
| 6,900,944 B2 | 5/2005 | Tomczyk |
| 6,935,756 B2 | 8/2005 | Sewall et al. |
| 7,030,997 B2 | 4/2006 | Neureuther et al. |
| 7,058,202 B2 | 6/2006 | Amidror |
| 7,068,434 B2 | 6/2006 | Florczak et al. |
| 7,114,750 B1 | 10/2006 | Alasia et al. |
| 7,194,105 B2 | 3/2007 | Hersch et al. |
| 7,246,824 B2 | 7/2007 | Hudson |
| 7,254,265 B2 | 8/2007 | Naske et al. |
| 7,255,911 B2 | 8/2007 | Lutz et al. |
| 7,288,320 B2 | 10/2007 | Steenblik et al. |
| 7,333,268 B2 | 2/2008 | Steenblik et al. |
| 7,336,422 B2 | 2/2008 | Dunn et al. |
| 7,372,631 B2 | 5/2008 | Ozawa |
| 7,389,939 B2 | 6/2008 | Jones et al. |
| 7,422,781 B2 | 9/2008 | Gosselin |
| 7,457,038 B2 | 11/2008 | Dolgoff |
| 7,457,039 B2 | 11/2008 | Raymond et al. |
| 7,468,842 B2 | 12/2008 | Steenblik et al. |
| 7,504,147 B2 | 3/2009 | Hannington |
| 7,545,567 B2 | 6/2009 | Tomczyk |
| 7,609,450 B2 | 10/2009 | Niemuth |
| 7,630,954 B2 | 12/2009 | Adamczyk et al. |
| 7,686,187 B2 | 3/2010 | Pottish et al. |
| 7,712,623 B2 | 5/2010 | Wentz et al. |
| 7,719,733 B2 | 5/2010 | Schilling et al. |
| 7,738,175 B2 | 6/2010 | Steenblik et al. |
| 7,751,608 B2 | 7/2010 | Hersch et al. |
| 7,762,591 B2 | 7/2010 | Schilling et al. |
| 7,763,179 B2 | 7/2010 | Levy et al. |
| 7,812,935 B2 | 10/2010 | Cowburn et al. |
| 7,830,627 B2 | 11/2010 | Commander et al. |
| 7,849,993 B2 | 12/2010 | Finkenzeller et al. |
| 8,027,093 B2 | 9/2011 | Commander et al. |
| 8,057,980 B2 | 11/2011 | Dunn et al. |
| 8,111,463 B2 | 2/2012 | Endle et al. |
| 8,149,511 B2 | 4/2012 | Kaule et al. |
| 8,241,732 B2 | 8/2012 | Hansen et al. |
| 8,284,492 B2 | 10/2012 | Crane et al. |
| 8,514,492 B2 | 8/2013 | Schilling et al. |
| 8,528,941 B2 | 9/2013 | Dörfler et al. |
| 8,537,470 B2 | 9/2013 | Endle et al. |
| 8,557,369 B2 | 10/2013 | Hoffmüller et al. |
| 8,693,101 B2 | 4/2014 | Tomczyk et al. |
| 8,778,481 B2 * | 7/2014 | Kaule ............... D21H 21/44 283/72 |
| 8,867,134 B2 | 10/2014 | Steenblik et al. |
| 8,908,276 B2 | 12/2014 | Holmes |
| 2001/0048968 A1 | 12/2001 | Cox et al. |
| 2002/0014967 A1 | 2/2002 | Crane et al. |
| 2002/0114078 A1 | 8/2002 | Halle et al. |
| 2002/0185857 A1 | 12/2002 | Taylor et al. |
| 2003/0031861 A1 | 2/2003 | Reiter et al. |
| 2003/0112523 A1 | 6/2003 | Daniell |
| 2003/0157211 A1 | 8/2003 | Tsunetomo et al. |
| 2003/0179364 A1 | 9/2003 | Steenblik et al. |
| 2003/0183695 A1 | 10/2003 | Labrec et al. |
| 2003/0228014 A1 | 12/2003 | Alasia et al. |
| 2003/0232179 A1 | 12/2003 | Steenblik et al. |
| 2003/0234294 A1 | 12/2003 | Uchihiro et al. |
| 2004/0020086 A1 | 2/2004 | Hudson |
| 2004/0022967 A1 | 2/2004 | Lutz et al. |
| 2004/0065743 A1 | 4/2004 | Doublet |
| 2004/0100707 A1 | 5/2004 | Kay et al. |
| 2004/0140665 A1 | 7/2004 | Scarborough et al. |
| 2004/0209049 A1 | 10/2004 | Bak |
| 2005/0094274 A1 | 5/2005 | Souparis |
| 2005/0104364 A1 | 5/2005 | Keller et al. |
| 2005/0161501 A1 | 7/2005 | Giering et al. |
| 2005/0180020 A1 | 8/2005 | Steenblik et al. |
| 2005/0247794 A1 | 11/2005 | Jones et al. |
| 2006/0003295 A1 | 1/2006 | Hersch et al. |
| 2006/0011449 A1 | 1/2006 | Knoll |
| 2006/0017979 A1 | 1/2006 | Goggins |
| 2006/0018021 A1 | 1/2006 | Tomkins et al. |
| 2006/0061267 A1 | 3/2006 | Yamasaki et al. |
| 2006/0227427 A1 | 10/2006 | Dolgoff |
| 2007/0058260 A1 | 3/2007 | Steenblik et al. |
| 2007/0092680 A1 | 4/2007 | Chaffins et al. |
| 2007/0164555 A1 | 7/2007 | Mang et al. |
| 2007/0183045 A1 | 8/2007 | Schilling et al. |
| 2007/0183047 A1 | 8/2007 | Phillips et al. |
| 2007/0273143 A1 | 11/2007 | Crane et al. |
| 2007/0284546 A1 | 12/2007 | Ryzi et al. |
| 2007/0291362 A1 | 12/2007 | Hill et al. |
| 2008/0130018 A1 | 6/2008 | Steenblik et al. |
| 2008/0143095 A1 | 6/2008 | Isherwood et al. |
| 2008/0160226 A1 | 7/2008 | Kaule et al. |
| 2008/0182084 A1 | 7/2008 | Tompkin et al. |
| 2009/0008923 A1 | 1/2009 | Kaule et al. |
| 2009/0243278 A1 | 10/2009 | Camus et al. |
| 2009/0290221 A1 | 11/2009 | Hansen et al. |
| 2009/0310470 A1 | 12/2009 | Yrjonen |
| 2009/0315316 A1 | 12/2009 | Staub et al. |
| 2010/0001508 A1 | 1/2010 | Tompkin et al. |
| 2010/0018644 A1 | 1/2010 | Sacks et al. |
| 2010/0045024 A1 | 2/2010 | Attner et al. |
| 2010/0068459 A1 | 3/2010 | Wang et al. |
| 2010/0084851 A1 | 4/2010 | Schilling |
| 2010/0109317 A1 | 5/2010 | Hoffmuller et al. |
| 2010/0177094 A1 | 7/2010 | Kaule et al. |
| 2010/0182221 A1 | 7/2010 | Kaule et al. |
| 2010/0194532 A1 | 8/2010 | Kaule |
| 2010/0208036 A1 | 8/2010 | Kaule |
| 2010/0308571 A1 | 12/2010 | Steenblik et al. |
| 2010/0328922 A1 | 12/2010 | Peters et al. |
| 2011/0017498 A1 | 1/2011 | Lauffer et al. |
| 2011/0019283 A1 | 1/2011 | Steenblik et al. |
| 2011/0056638 A1 | 3/2011 | Rosset |
| 2011/0179631 A1 | 7/2011 | Gates et al. |
| 2012/0019607 A1 | 1/2012 | Dunn et al. |
| 2012/0033305 A1 | 2/2012 | Moon et al. |
| 2012/0091703 A1 | 4/2012 | Maguire et al. |
| 2012/0098249 A1 | 4/2012 | Rahm et al. |
| 2012/0194916 A1 | 8/2012 | Cape et al. |
| 2012/0243744 A1 | 9/2012 | Camus et al. |
| 2013/0003354 A1 | 1/2013 | Meis et al. |
| 2013/0010048 A1 | 1/2013 | Dunn et al. |
| 2013/0038942 A1 | 2/2013 | Holmes |

(56) References Cited

U.S. PATENT DOCUMENTS

| | | | |
|---|---|---|---|
| 2013/0044362 A1* | 2/2013 | Commander | B42D 25/342 359/291 |
| 2013/0154250 A1 | 6/2013 | Dunn et al. | |
| 2014/0174306 A1 | 6/2014 | Wening et al. | |
| 2014/0175785 A1 | 6/2014 | Kaule et al. | |
| 2014/0353959 A1* | 12/2014 | Lochbihler | G02B 5/08 283/85 |
| 2014/0367957 A1 | 12/2014 | Jordan | |
| 2016/0176221 A1* | 6/2016 | Holmes | B42D 25/29 283/77 |
| 2016/0257159 A1 | 9/2016 | Attner et al. | |

FOREIGN PATENT DOCUMENTS

| | | |
|---|---|---|
| CN | 1102865 | 5/1995 |
| CN | 1126970 | 11/2003 |
| CN | 1950570 | 4/2007 |
| CN | 101678664 | 3/2010 |
| DE | 19804858 | 8/1999 |
| DE | 19932240 | 1/2001 |
| DE | 10100692 | 8/2004 |
| EP | 0090130 | 10/1983 |
| EP | 0092691 | 11/1983 |
| EP | 0118222 | 9/1984 |
| EP | 0203752 | 12/1986 |
| EP | 0253089 | 1/1988 |
| EP | 0318717 | 6/1989 |
| EP | 0415230 | 3/1991 |
| EP | 0319157 | 7/1992 |
| EP | 0801324 | 10/1997 |
| EP | 0887699 | 12/1998 |
| EP | 0930174 | 7/1999 |
| EP | 0997750 | 5/2000 |
| EP | 1356952 | 10/2003 |
| EP | 1002640 | 5/2004 |
| EP | 1354925 | 4/2006 |
| EP | 1659449 | 5/2006 |
| EP | 1743778 | 1/2007 |
| EP | 1876028 | 1/2008 |
| EP | 1897700 | 3/2008 |
| EP | 1931827 | 4/2009 |
| EP | 2335937 | 6/2011 |
| EP | 2338682 | 6/2011 |
| EP | 2162294 | 3/2012 |
| FR | 2803939 | 7/2001 |
| FR | 2952194 | 5/2011 |
| GB | 1095286 | 12/1967 |
| GB | 2103669 | 2/1983 |
| GB | 2362493 | 11/2001 |
| GB | 2395724 | 6/2004 |
| GB | 2433470 | 6/2007 |
| GB | 2490780 | 11/2012 |
| JP | 41-004953 | 3/1966 |
| JP | 46-022600 | 8/1971 |
| JP | 04-234699 | 8/1992 |
| JP | H05-508119 | 11/1993 |
| JP | 10-035083 | 2/1998 |
| JP | 10-039108 | 2/1998 |
| JP | 11-501590 | 2/1999 |
| JP | 11-189000 | 7/1999 |
| JP | 2000-56103 | 2/2000 |
| JP | 2000-233563 | 8/2000 |
| JP | 2000-256994 | 9/2000 |
| JP | 2001-055000 | 2/2001 |
| JP | 2001-516899 | 10/2001 |
| JP | 2001-324949 | 11/2001 |
| JP | 2003-039583 | 2/2003 |
| JP | 2003-165289 | 6/2003 |
| JP | 2003-528349 | 9/2003 |
| JP | 2003-326876 | 11/2003 |
| JP | 2004-262144 | 9/2004 |
| JP | 2004-317636 | 11/2004 |
| JP | 2005-193501 | 7/2005 |
| JP | 2009-274293 | 11/2009 |
| JP | 2011-502811 | 1/2011 |
| KR | 10-0194536 | 6/1999 |
| KR | 2002170350000 | 3/2001 |
| KR | 2003119050000 | 5/2003 |
| KR | 1005443000000 | 1/2006 |
| KR | 1005613210000 | 3/2006 |
| RU | 2111125 | 5/1998 |
| RU | 2245566 | 1/2005 |
| RU | 2010101854 | 7/2011 |
| TW | 575740 | 2/2004 |
| WO | WO 92/08998 | 5/1992 |
| WO | WO 1993024332 | 12/1993 |
| WO | WO 96/35971 | 11/1996 |
| WO | WO 97/19820 | 6/1997 |
| WO | WO 97/44769 | 11/1997 |
| WO | WO 98/13211 | 4/1998 |
| WO | WO 98/15418 | 4/1998 |
| WO | WO 98/26373 | 6/1998 |
| WO | WO 1999014725 | 3/1999 |
| WO | WO 1999023513 | 5/1999 |
| WO | WO 99/26793 | 6/1999 |
| WO | WO 99/66356 | 12/1999 |
| WO | WO 01/07268 | 2/2001 |
| WO | WO 01/11591 | 2/2001 |
| WO | WO 01/39138 | 5/2001 |
| WO | WO 01/53113 | 7/2001 |
| WO | WO 01/63341 | 8/2001 |
| WO | WO 01/71410 | 9/2001 |
| WO | WO 02/40291 | 5/2002 |
| WO | WO 02/43012 | 5/2002 |
| WO | WO 03/005075 | 1/2003 |
| WO | WO 03/007276 | 1/2003 |
| WO | WO 03/022598 | 3/2003 |
| WO | WO 03/053713 | 7/2003 |
| WO | WO 03/061980 | 7/2003 |
| WO | WO 03/061983 | 7/2003 |
| WO | WO 03/082598 | 10/2003 |
| WO | WO 03/098188 | 11/2003 |
| WO | WO 2004/022355 | 3/2004 |
| WO | WO 2004/036507 | 4/2004 |
| WO | WO 2004/087430 | 10/2004 |
| WO | WO 2005/106601 | 11/2005 |
| WO | WO 2006029744 | 3/2006 |
| WO | WO 2007/076952 | 7/2007 |
| WO | WO 2007133613 | 11/2007 |
| WO | WO 2009/000527 | 12/2008 |
| WO | WO 2009/000528 | 12/2008 |
| WO | WO 2009/000529 | 12/2008 |
| WO | WO 2009/000530 | 12/2008 |
| WO | WO 2009/121784 | 10/2009 |
| WO | WO 2010/015383 | 2/2010 |
| WO | WO 2010094691 | 8/2010 |
| WO | WO 2010/136339 | 12/2010 |
| WO | WO 2011015384 | 2/2011 |
| WO | WO 2011019912 | 2/2011 |
| WO | WO 2011/044704 | 4/2011 |
| WO | WO 2011051669 | 5/2011 |
| WO | WO 2011/107793 | 9/2011 |
| WO | WO 2011107793 | 9/2011 |
| WO | WO 2011122943 | 10/2011 |
| WO | WO 2012/027779 | 3/2012 |
| WO | WO 2012103441 | 8/2012 |
| WO | WO 2013028534 | 2/2013 |
| WO | WO 2013093848 | 6/2013 |
| WO | WO 2013098513 | 7/2013 |

OTHER PUBLICATIONS

Drinkwater, K. John, et al., "Development and applications of Diffractive Optical Security Devices for Banknotes and High Value Documents", Optical Security and Counterfeit Deterrence Techniques III, 2000, pp. 66-77, SPIE vol. 3973, San Jose, CA.

Fletcher, D.A., et al., "Near-field infrared imaging with a microfabricated solid immersion lens", Applied Physics Letters, Oct. 2, 2000, pp. 2109-2111, vol. 77, No. 14.

Gale, M. T., et al., Chapter 6—Replication, Micro Optics: Elements, Systems and Applications, 1997, pp. 153-177.

(56) References Cited

OTHER PUBLICATIONS

Hardwick, Bruce and Ghioghiu Ana, "Guardian Substrate as an Optical Medium for Security Devices", Optical Security and Counterfeit Deterrence Techniques III, 2000, pp. 176-179, SPIE vol. 3973, San Jose, CA.
Hutley, M.C., et al., "The Moiré Magnifier", Pure Appl. Opt. 3, 1994, pp. 133-142, IOP Publishing Ltd., UK.
Hutley, M.C., "Integral Photography, Superlenses and the Moiré Magnifier", European Optical Society, 1993, pp. 72-75, vol. 2, UK.
Hutley, M., et al., "Microlens Arrays", Physics World, Jul. 1991, pp. 27-32.
Kamal, H., et al., "Properties of Moiré Magnifiers", Opt. Eng., Nov. 1998, pp. 3007-3014, vol. 37, No. 11.
Leech, Patrick W., et al., Printing via hot embossing of optically variable images in thermoplastic acrylic lacquer, Microelectronic Engineering, 2006, pp. 1961-1965, vol. 83, No. 10, Elsevier Publishers BV, Amsterdam, NL.
Lippmann, G., "Photgraphie—Épreuves Réversibles, Photographies Intégrals", Académie des Sciences, 1908, pp. 446-451, vol. 146, Paris.
Liu, S., et al., "Artistic Effect and Application of Moiré Patterns in Security Holograms", Applied Optics, Aug. 1995, pp. 4700-4702, vol. 34, No. 22.
Phillips, Roger W., et al., Security Enhancement of Holograms with Interference Coatings, Optical Security and Counterfeit Deterrence Techniques III, 2000, pp. 304-316, SPIE vol. 3973, San Jose, CA.
Steenblik, Richard A., et al., Unison Micro-optic Security Film, Optical Security and Counterfeit Deterrence Techniques V, 2004, pp. 321-327, SPIE vol. 5310, San Jose, CA.
Van Renesse, Rudolf L., Optical Document Security, 1994, Artech House Inc., Norwood, MA.
Van Renesse, Rudolf L., Optical Document Security, 1998, 2nd edition, pp. 232-235, 240-241 and 320-321, Artech House Inc., Norwood, MA (ISBN 0-89006-982-4).
Van Renesse, Rudolf L., Optical Document Security, 2005, 3rd edition, pp. 62-169, Artech House Inc., Norwood, MA (ISBN 1-58053-258-6).
Wolpert, Gary R., Design and development of an effective optical variable device based security system incorporating additional synergistic security technologies, Optical Security and Counterfeit Deterrence Techniques III, 2000, pp. 55-61, SPIE vol. 3973, San Jose, CA.
Zhang, X., et al., "Concealed Holographic Coding for Security Applications by Using a Moiré Technique", Applied Optics, Nov. 1997, pp. 8096-8097, vol. 36, No. 31.
"Complaint" filed by Crane & Co., Inc., dated Feb. 19, 2016; *Crane & Co., Inc.v. Gregory R. Jordan and Ad Lucem Corp.*, Massachusetts Trial Court, Civil Action No. 16/0560-BLS-2.
"Amended Complaint" filed by Crane & Co., Inc., dated Feb. 22, 2016; *Crane & Co., Inc.v. Gregory R. Jordan and Ad Lucem Corp.*, Massachusetts Trial Court, Civil Action No. 16/0560-BLS-2.
"Amended Answer, Affirmative Defenses, and Counterclaims to Amended Complaint" filed by Gregory R. Jordan and Ad Lucem Corp., dated Oct. 11, 2016; *Crane & Co., Inc.v. Gregory R. Jordan and Ad Lucem Corp.*, Massachusetts Trial Court, Civil Action No. 16/0560-BLS-2.
Dunn, et al., "Three-Dimensional Virtual Images for Security Applications", Optical Security and Counterfeit Deterrence Techniques V, (published Jun. 3, 2004), Proc. SPIE 5310. no date.
Muke, "Embossing of Optical Document Security Devices", Optical Security and Counterfeit Deterrence Techniques V, (published Jun. 3, 2004), Proc. SPIE 5310. no date.

* cited by examiner

SINGLE LAYER IMAGE PROJECTION FILM

CROSS-REFERENCE TO RELATED APPLICATIONS

This application is a continuation-in-part of U.S. patent application Ser. No. 14/304,330 filed Jun. 13, 2014, which claims the benefit of U.S. Provisional Patent Application Ser. No. 61/834,752 filed Jun. 13, 2013, which are hereby incorporated herein by reference in their entirety.

BACKGROUND

Various optical materials have been employed to provide authentication of currency and documents, to identify and distinguish authentic products from counterfeit products, and to provide visual enhancement of manufactured articles and packaging. The evolution of such material stems largely from the search for a mechanism to resist counterfeiting of certain articles and products, or alternatively to render such copying obvious. Examples of optical materials used in anti-counterfeiting applications include holographic displays, as well as image systems that rely on lenticular structures or arrays of micro-lenses to project images that exhibit optical effects which cannot be reproduced using traditional printing and/or photocopying processes.

Optical materials based upon the concept of moiré magnification are particularly attractive for use in anti-counterfeiting applications. Such materials typically include a top lens layer, an intermediate substrate (an optical spacer), and a bottom print or object layer which contains micro-object(s) that are to be magnified or otherwise altered when viewed through the lenses. Such materials can create attractive visual effects that can be desirable in anti-counterfeiting and aesthetic applications.

While existing optical materials can produce a variety of visual effects, new optical materials are continually needed to stay ahead of the counterfeiter's ability to access or develop new imaging technologies.

SUMMARY

Moiré-type magnification systems are provided. The moiré magnification systems can comprise a surface and a periodic array of image relief microstructures having a periodic surface curvature disposed on or within the surface. The image relief microstructures can have a first image repeat period along a first image reference axis within the array, and the periodic surface curvature can have a first curvature repeat period along a first curvature reference axis within the array. Transmission of light through the array, reflection of light from the array, or a combination thereof forms a magnified moiré image.

The image relief microstructures can be (+)-relief or (−)-relief image relief microstructures. In some cases, the image relief microstructures can be (+)-relief image relief microstructures that upwardly project from the surface terminating in an arcuate image generating surface. In other cases, the image relief microstructures can be (−)-relief image relief microstructures that are voids formed within the surface terminating in an arcuate image generating surface. Depending on the desired appearance of the magnified moiré image, the image relief microstructures can be a positive image representation or a negative image representation.

In other contemplated embodiments, the microstructures do not extend from an arcuate image generating surface to a planar optical surface but instead start or terminate somewhere between these surfaces. More specifically, the single layer image projection system in these other contemplated embodiments is made up of an arrangement of optionally reflective arcuate elements having an upper arcuate surface, a lower surface, and an arcuate area bounded by the upper arcuate and lower surfaces, and an optionally reflective pattern of image relief microstructures disposed on or within at least some of the upper arcuate surfaces of the arcuate elements. The arrangement of optionally reflective arcuate elements and the optionally reflective pattern of image relief microstructures are in a single layer and interact to project one or more images. For an upper arcuate surface with convex surface curvature, the image relief microstructures extend downwardly from this surface terminating within the arcuate area, and for an upper arcuate surface with concave surface curvature, the image relief microstructures extend upwardly from this surface terminating within an area defined by the curvature of the upper arcuate surface.

The radius of curvature of the arcuate image generating surfaces present in the image relief microstructures (and by extension the radius of curvature of the periodic surface curvature) can be varied. In some embodiments, the radius of curvature of the arcuate image generating surfaces present in the image relief microstructures (and by extension the periodic surface curvature) can be from 1 micron to 500 microns.

The arcuate image generating surfaces of the image relief microstructures in the array can have convex or concave periodic surface curvature across the array. In certain embodiments, the periodic surface curvature of the array is convex.

As described above, the image relief microstructures can have a first image repeat period along a first image reference axis within the array, and the periodic surface curvature can have a first curvature repeat period along a first curvature reference axis within the array. The first image repeat period and the first curvature repeat period can vary in size, depending on the desired dimensions and characteristics of the resulting moiré-type magnification system. In some embodiments, the first image repeat period is from 1 micron to 1000 microns, and the first curvature repeat period is from 1 micron to 1000 microns.

The ratio of the first image repeat period to the first curvature repeat period can be varied to provide for varied visual effects. In some embodiments, the ratio of the first image repeat period to the first curvature repeat period can be 1. In other embodiments, the ratio of the first image repeat period to the first curvature repeat period can be less than 1. In other embodiments, the ratio of the first image repeat period to the first curvature repeat period can be greater than 1. In some embodiments, the periodic surface curvature and the image relief microstructures can be aligned, such that the first curvature reference axis is parallel or coincident with the first image reference axis. In other embodiments, the periodic surface curvature is skewed relative to the image relief microstructures, such that the first curvature reference axis is not parallel to or coincident with the first image reference axis.

By varying and/or combining the above features (e.g., scaling of the first image repeat period relative to the first curvature repeat period, skew of the periodic surface curvature relative to the image relief microstructures, etc.), moiré-type magnification systems that display a variety of visual effects, such as movement, can be obtained. In some cases, the magnified moiré image appears to lie on a spatial plane above or below the moiré-type magnification system. In some embodiments, the magnified moiré image appears to move between a spatial plane beneath the system and a spatial plane above the system upon rotation of the system about an axis perpendicular to the surface. In some embodiments, the magnified moiré image appears to transform from a first form, shape, size or color to a second form, shape, size or color upon rotation of the system about an axis parallel to the surface. In certain embodiments, the magnified moiré image can appear to slide counter-directionally within a plane parallel to or coplanar with the surface upon rotation of the system about an axis parallel to the surface.

The moiré-type magnification systems can be provided in a variety of forms, depending on the intended application for the system. In certain embodiments, the moiré-type magnification systems can be formed on an article or packaging for the article, for example, by embossing, casting, molding, or stamping the array of image relief microstructures on the article or packaging for the article. In certain embodiments, the moiré-type magnification systems can be formed on a substrate (e.g., a polymer film or metallic foil) that can be applied to an article or packaging for the article.

The moiré-type magnification systems can be employed to provide authentication of articles (e.g., as a security and anti-counterfeiting feature to identify and distinguish authentic products from counterfeit products) and/or to provide visual enhancement of manufactured articles and packaging. By way of example, the moiré-type magnification systems can be employed on a document or packaging for a document. The document can be, for example, a banknote, a check, a money order, a passport, a visa, a vital record (e.g., a birth certificate), an identification card, a credit card, an atm card, a license, a tax stamp, a postage stamp, a lottery ticket, a deed, a title, a certificate, or a legal document. By way of example, the moiré-type magnification systems can be employed to provide visual enhancement of an article, such as coinage, CDs, DVDs, or Blu-Ray Discs, or packaging, such as aluminum cans, bottles (e.g., glass or plastic bottles), plastic film, or foil wrappers.

Also provided are methods of making the moiré-type magnification systems described herein. Methods of making moiré-type magnification systems can comprise forming a periodic array of image relief microstructures having a periodic surface curvature on or within a surface. The periodic array of image relief microstructures can be formed by a variety of suitable methods, including embossing, casting, molding, and stamping. Also provided are hard and soft embossing masters comprising the moiré-type magnification systems described herein.

DESCRIPTION OF DRAWINGS

FIG. 9A illustrates an aluminum coated glass substrate with photoresist. FIG. 9B illustrates an exposure step in creating the master. FIG. 9C shows the result of the patterning step. FIG. 9D shows shaped curvature structures. FIG. 9E shows photopolymer applied over curvature structures to make a soft curvature master. FIG. 9F shows exposure of photoresist in the soft curvature master voids. FIG. 9G shows a soft embossing master with negative image relief microstructures. FIG. 9H shows photopolymer replication of the negative ImageArc master. FIG. 9I shows the resulting ImageArc device comprising positive image relief microstructures.

FIG. 10A illustrates two thicknesses of photoresist. FIG. 10B illustrates an exposure step. FIG. 10C shows the result of the patterning step with two different photoresist coating thicknesses. FIG. 10D shows the two different curvature profiles that are obtained.

DETAILED DESCRIPTION

Figure 1:
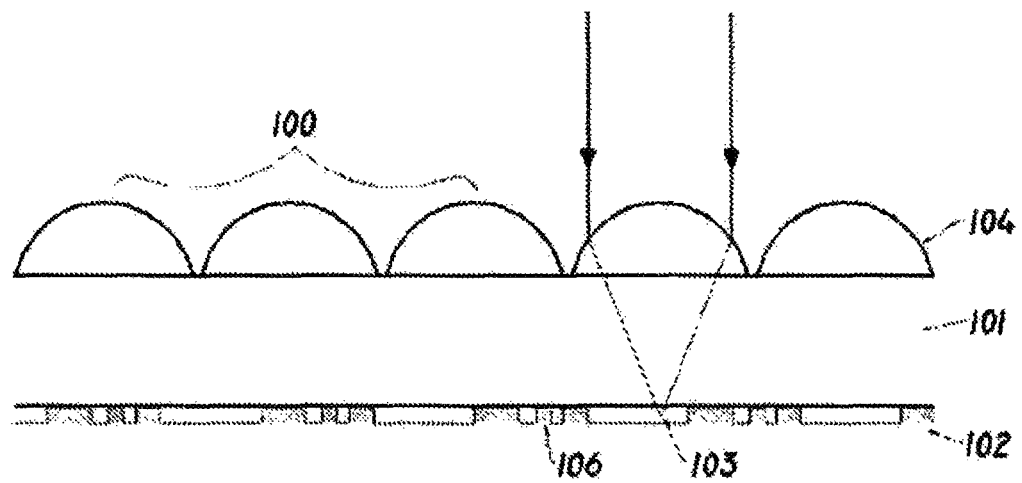
FIG. 1 is a cross-sectional view of a multilayer moiré magnifier device that includes a two-dimensional array of lenses positioned above an array of icons. The lenses are separated from the array by an optical spacer. The device produces a synthetically magnified image through the unified performance of a multiplicity of individual lens icon image systems.

Integral image and moiré magnification devices have been employed to provide authentication of currency and documents, to identify and distinguish authentic products from counterfeit products, and to provide visual enhancement of manufactured articles and packaging. These optical devices are generally multilayer constructions that include a lens array, an optical spacer, and an image array. The lens array and the image array in these devices can be configured to possess varying scale ratios and axial rotations relative to one another, allowing them to display enlarged composite images. These devices can exhibit image movement with tilt, low sensitivity to lighting conditions, and wide viewing angle.

Holograms, which compete in some of the same market applications, enjoy certain advantages such as thin cross section, low cost due to fewer required layers, and no requirement to align multiple layers during their manufacture. Holograms show optical variability with tilt, but rely on a strong point light source due to their reliance on light diffraction.

Moiré magnification refers to a phenomenon that occurs when a grid comprised of identical image objects is viewed through a lens grid having approximately the same grid dimension. A composite image (i.e., a magnified moiré image) is created from individual images generated by the individual image systems (i.e. lens and image object) in the grids. By varying the relative scale and rotation of lens grid and the grid of image objects, many variations of the magnified moiré image are possible, providing stereoscopically perceived effects, such as images that appear to lie above the plane of the grids, images that appear to lie below the plane of the grids, and images that appear to move or slide orthogonally within the plane of the grids as the grids are tilted. The fundamental operating principle of such moiré magnification arrangements is described, for example, in the article "The moiré magnifier," M. C. Hutley, R. Hunt, R. F. Stevens and P. Savander, Pure Appl. Opt 3 (1994), pp. 133-142.

Provided herein are moiré-type magnification systems. The systems can produce stereoscopic moiré magnification effects using a simplified projection system described herein, and subsequently referred, to as "ImageArc." ImageArc can be used to form low cost, optically variable structures for overt protection of products and documents, articles for sale, from counterfeiting, as well as a means of improving the aesthetic value of the product.

The moiré-type magnification systems can include a surface relief microstructure array for controlling light transmission and/or reflection for the purpose of projecting images having stereoscopically perceived movement and depth. The surface relief microstructure array can include a periodic array of micro-scale, three-dimensional image shapes. The image shapes in the array can exhibit periodic surface curvature across the array, resulting in a periodic array of image relief microstructures that have a periodic surface curvature with a periodicity in relation to the periodicity of the array of image relief microstructures. By spatially varying the scale, rotation, and position of the periodic surface curvature relative to the periodic array of image relief microstructures, a moiré magnifier arrangement is realized due to redirection of incident light impinging upon the arcuate image generating surfaces of the image relief microstructures, when viewed relative to un-featured (e.g., planar) regions of the surface that provide contrasting light intensity.

The moiré-type magnification systems described herein can be configured to be reflective when reflective materials are used, transmissive when light transmitting materials are used, or a combination of both in cases where the material allows either reflection or transmission in different viewing conditions (e.g., in situations having normal levels of ambient lighting). The magnified moiré images formed by ImageArc can exhibit dynamic movement resulting from light intensity modulation, and/or, in further variations, color variation.

The moiré-type magnification systems described herein can be low cost (e.g., fundamentally lower cost than other moiré magnification devices) because it is a single layer device. Cost is a severe limitation for many products that are manufactured in bulk yet have a need for optically variable overt authentication technology. A lower price point after considering each step in its creation to integration onto the desired final product is an important consideration, especially for use in conjunction with low-cost articles (e.g., banknotes, lottery tickets, etc.).

ImageArc can be formed in a single step (e.g., a single embossment, casting, molding, or stamping). In many cases, the substrate on which the system will be positioned will already pass through equipment which is capable of forming ImageArc during the course of its production. Accordingly, ImageArc can be readily applied to such substrates by incorporating, for example, an embossing master having the requisite structure into an existing manufacturing process. This is in contrast to multilayer moiré structures. Multilayer moiré structures cannot be formed on a substrate in a single step; rather, they must be pre-manufactured using a multi-step process, and applied to an article. If desired, the moiré-type magnification systems described herein can also be fabricated to have a thinner cross section than multi layer moiré magnifiers owing to their 'single-layer' design.

Production of the moiré-type magnification systems described herein only requires multilayer registration during origination (e.g., during production of a master), and not during manufacture. As a consequence, more sophisticated designs requiring precise registration alignment can be implemented (e.g., integral image patterns) without significantly increasing the difficulty and/or cost of production.

The moiré-type magnification systems described herein utilize directional reflection or transmission from the arcuate image generating surfaces of the image relief microstructures to form a magnified moiré image. As such, the system produces angle-dependent moiré magnified images from a single surface array. This is in contrast to multilayer moiré structures, where the moiré image is produced from a first image array, and refracted through a second, separate array of lenses. Similarly, 'reflective-mode' moiré magnifiers also rely on two separate arrays (i.e., a reflective lens array and an image array).

The moiré-type magnification systems described herein do not necessarily require a substrate film, as is often found with other security products. Since the ImageArc structures can be manufactured directly onto the surface of many products, no additional film cost is incurred. Using ImageArc, synthetic composite images may be provided into preexisting lacquers or coatings, or into the material from which products are made, driving the additional manufacturing cost down to near zero while adding dramatically to the security of the embellished system. By way of example, the moiré-type magnification systems described herein can be patterned onto and/or into a preexisting polymer coating on a banknote, patterned directly onto and/or into polymer banknotes, patterned directly onto and/or scratch off lottery tickets, patterned directly onto and/or into aluminum beverage cans, patterned directly onto and/or into consumer electronic enclosures, and patterned directly onto and/or into plastic or foil packaging. The moiré-type magnification systems described herein can also be used to embellish vinyl textile materials, eyewear frames, and even into the surfaces of food items, such as candy.

Moiré Magnification Systems

As described above, the moiré magnification systems provided herein can comprise a surface and a periodic array of image relief microstructures having a periodic surface curvature disposed on or within the surface. The design of such systems can be illustrated by first describing a multilayer moiré magnifier device.

Referring now to the drawings, FIG. 1 shows a cross section of a moiré magnifier device which includes a lens array 100, an optical spacer 101, and an image array (also referred to as an object array, an icon array, or a motif array) 102. An optical spacer 101 places the image array 102 at the focal point 103 of the lens array 100. Each lens 104 in lens array 100 images its portion of the image array in order to form a composite image.

Figure 2:
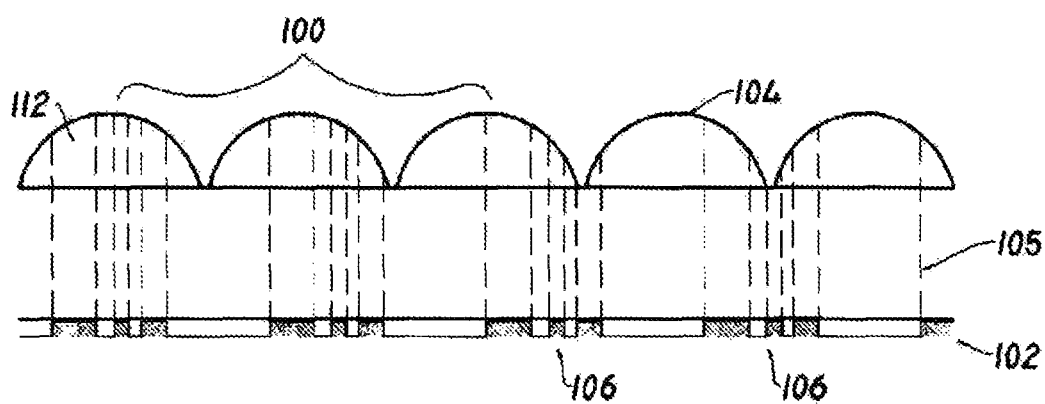
FIG. 2 is a cross-sectional view of a multilayer moiré magnifier device with slicing lines corresponding to image regions.
Figure 3A:
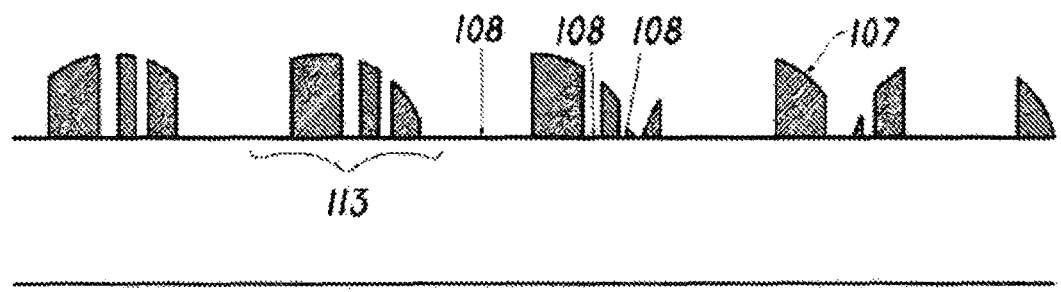
FIG. 3A is a cross-sectional view of an ImageArc device. In this example device, the image relief microstructures are positive image representation, and thus have footprints that correspond to underlying image element regions in the device illustrated in FIG. 1 and FIG. 2.

Referring now to FIG. 2, if one were to superimpose imaginary slicing lines 105 on the multilayer moiré magnifier device shown in FIG. 1, drawn upwards from the image array 102 and intersects with the upper curvature of the lens array 100, subtraction of slices from the lens array 100 in the pattern prescribed by the footprint of the image element regions 106 generates a periodic array of image relief microstructures 107, as shown in FIG. 3A. The image relief microstructures illustrated in this example are (+)-relief image relief microstructures, meaning they upwardly project from the surface terminating in an arcuate Image generating surface. The image relief microstructures in this example are a positive image representation, as discussed in more detail below. The arcuate image generating surfaces of the image relief microstructures in the array have a periodic surface curvature across the array. The image relief microstructures 107 are surrounded by a non-relieved surrounding area 108.

Figure 3B:
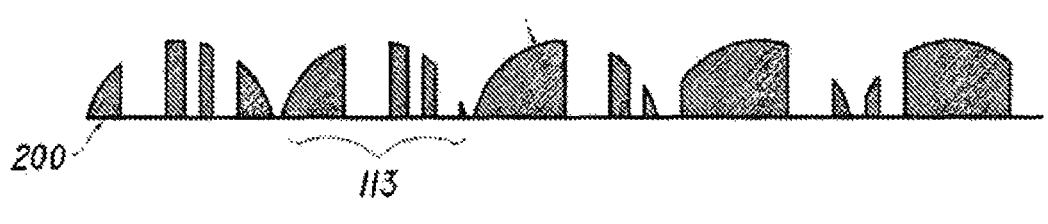
FIG. 3B is a cross-sectional view of an ImageArc device. In this example device, the image relief microstructures are negative image representation, and thus have footprints that correspond to the background in which the image element regions are presented in the device illustrated in FIG. 1 and FIG. 2.
Figure 3C:
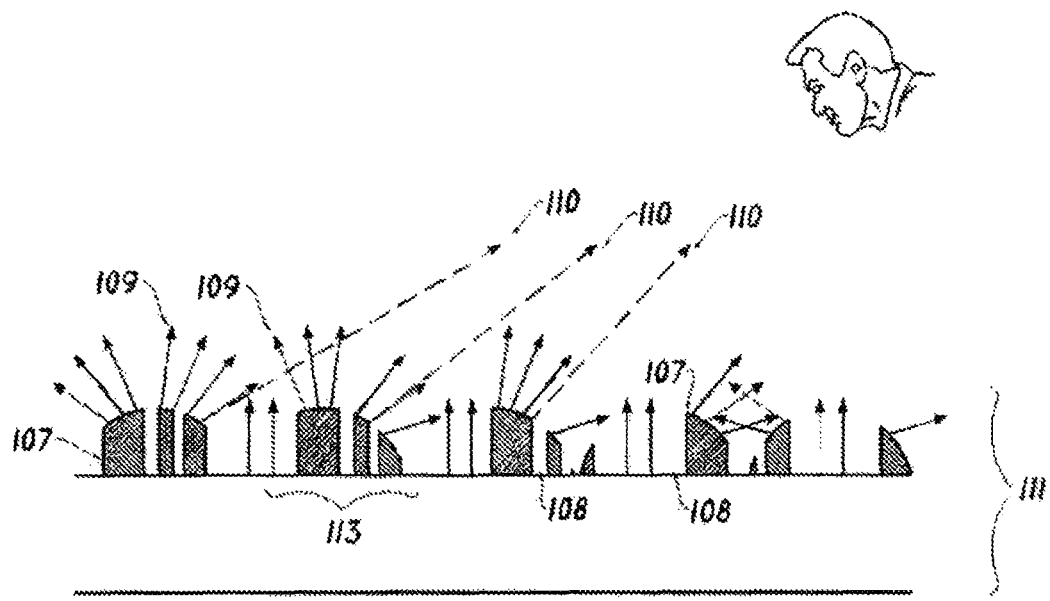
FIG. 3C depicts the directional behavior of light after interacting with an ImageArc device.

FIG. 3C illustrates the manner in which moiré magnification images can be formed by light impinging upon the moiré magnification system illustrated FIG. 3A. Light impinging on the image relief microstructures is redirected by reflection. Normal-to-surface light rays 109 are reflected radially outward from the arcuate image generating surfaces of the image relief microstructures 107, while non-image areas 108 are simply reflected. From the vantage point of the viewer, each 'island' of structure with curvature, or image relief element 113, will present a point of light 110, (illustrated by dotted lines directed toward viewer) corresponding to a port of a magnified moiré image. The multiplicity of point reflections will contrast with the non-image portions 108, which are directed away from the viewer. In combination, the arcuate image generating surfaces of the image relief microstructures 107 and non-imaging areas 108 produce magnified images that are visible across a range of viewing angles. As the system 111 is tilted (or as the viewer's vantage point changes), the array of reflection points 110 that the viewer perceives will be reflected from different portions of the array of image relief microstructures, generating new images. As a consequence, the magnified moiré images formed by the array can exhibit dynamic movement and/or depth effects.

FIG. 3B illustrates an example system employing image relief microstructures that are a negative image representation. If one were to use the same image slicing lines 105 illustrated in FIG. 2, and instead remove image area volumes 112, one would generates a similar periodic array of image relief microstructures 200, as shown in FIG. 3B. The image relief microstructures illustrated in this example are also (+)-relief image relief microstructures, meaning they upwardly project from the surface terminating in art arcuate image generating surface. However, the footprint of the image relief microstructures 107 corresponds to the background in which the image element regions are presented in the device illustrated in FIG. 1 and FIG. 2.

In systems that include image relief microstructures that are a positive image representation (e.g., FIG. 3A) or a negative image representation (e.g., FIG. 3B), the same image motif can be perceived, albeit with relative bright areas 110 and dark areas 109 reversed. In the case of the system illustrated in FIG. 3A, from most angles of view, the arcuate image generating surfaces of the image relief microstructures 107 will appear to have a greater relative light intensity or brightness relative to the background 108. However, from other angles, specular reflection from the background 108 will be directed towards the viewer, and the background 108 will instead appear bright and the arcuate image generating surfaces of the image relief microstructures 107 will appear darker. In the case of the system illustrated in FIG. 3B, the same effects will be observed, but with these intensities reversed.

Figure 3D:
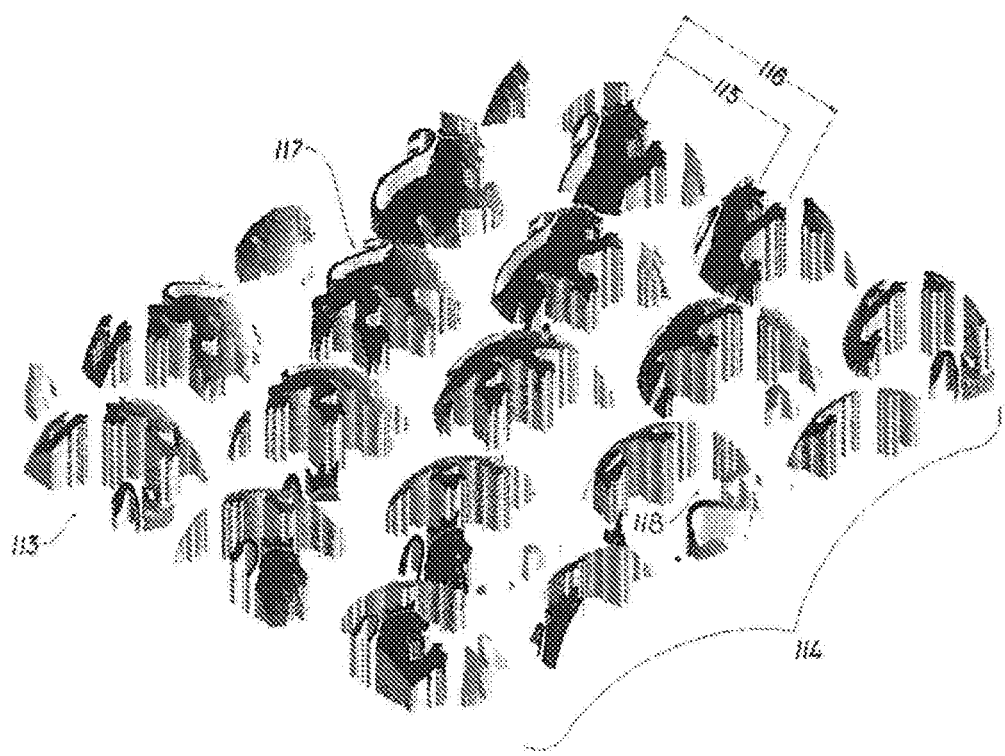
FIG. 3D is an isometric view of an array of an ImageArc device.

FIG. 3D illustrates an isometric view of a periodic array 114 of image relief microstructures 113 having a periodic surface curvature disposed on a surface. For purposes of illustration, a lion motif was selected as the image motif. Particular attention is given to the location of the lions with respect to the variation of the surface curvature. In this example, the periodicity of the lion images 115 (the image repeat period) is different from the periodicity of the surface curvature 116 (the curvature repeat period) so that in some regions of the array, the body of the lion and the crest of the surface curvature are coincident 117, and in other parts of the array they are not 118. The array depicted here represents only a small portion of a typical periodic array, which may include hundreds of thousands of microstructured reliefs.

By varying and/or combining aspects of the periodic array of image relief microstructures and the periodic surface curvature of the image relief microstructures (e.g., the scaling of the first image repeat period relative to the first curvature repeat period, skew of the periodic surface curvature relative to the image relief microstructures, etc.), moiré-type magnification systems that display a variety of visual effects, such as movement, can be obtained. All of the visual effects that can be generated using the moiré magnification system (as well as the particular selection of array elements necessary to produce a given visual effect) are not reintroduced here in detail, as these effects have been described with respect to multilayer moiré-type magnification systems. See, for example, U.S. Pat. No. 7,333,268 to Steenblik et al., which is incorporated by reference herein in its entirety. However, by way of example, certain design components that can be used to arrive at moiré magnification systems exhibiting varied visual effects are described below.

Figure 4:
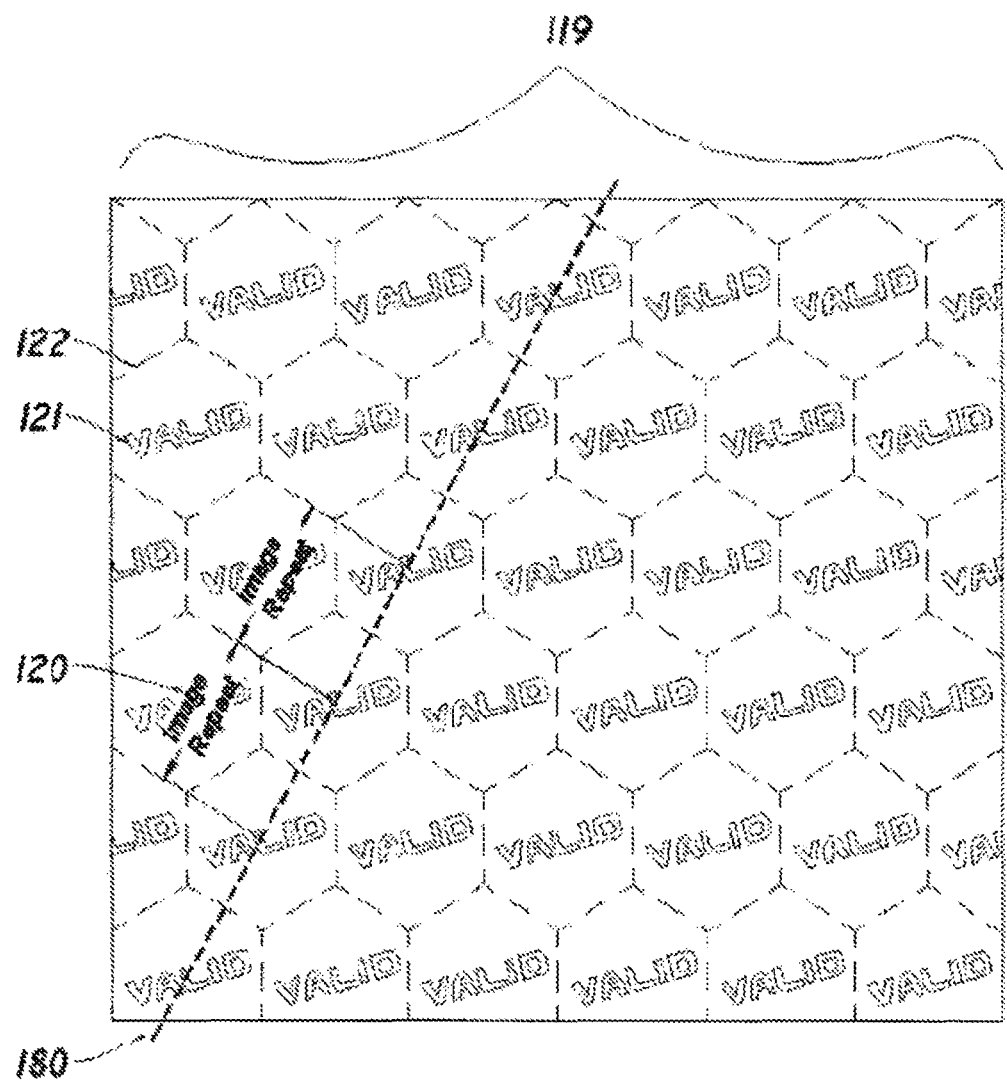
FIG. 4 shows a two-dimensional image array with hexagonal lattice structure.

FIG. 4 illustrates an image array 119 having an image repeat period 120 along a first image reference axis 180 within the image array. For purposes of illustration, a textual image ("VALID") was selected as the image motif 121. The array type can be any of the known crystallographic lattice structures that can be defined by a repeatable two-dimensional 'unit cell.' A hexagonal lattice is depicted here that shows one image motif 121 per hexagonal unit cell 122, but will not be present in the final structure.

Figure 5:
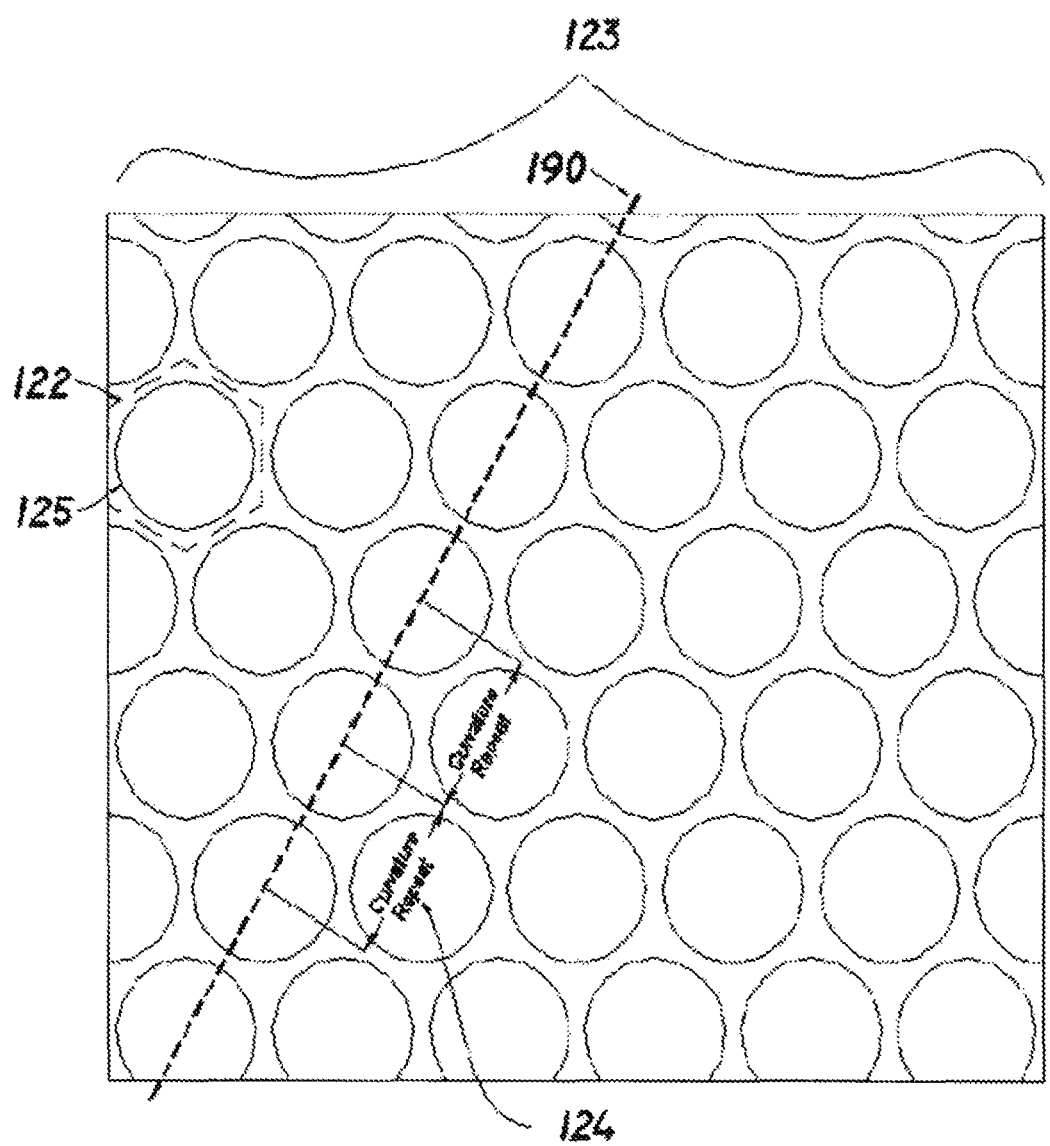
FIG. 5 shows two-dimensional curvature array with hexagonal lattice structure.

FIG. 5 illustrates a periodic curvature array 123, also having a curvature repeat period 124 along a first curvature reference axis 190 within the image array, and a lattice structure 122 of the same form as the image array 119 (in this case hexagonal). The curvature array 123 can be used to define a curvature mold that can be used during an intermediate step in the creation of ImageArc structures. The base geometry of the curvature elements 125 can be defined in this step, with alternative footprints possible. That is, the curvature footprints 125 may be circular or hexagonal, or the shape of any alternative lattice arrangements considered, and can be as large as the unit cell 122 or smaller. Here, the curvature footprints have circular base footprints. The array can be used to create an intermediate curvature array mold, where each curvature element will be hemispherical in shape with positive curvature. For purposes of illustration, the image array 119 and curvature array 123 begin as two-dimensional layer representations which will be given structure and height after first performing array manipulations.

Figure 6:
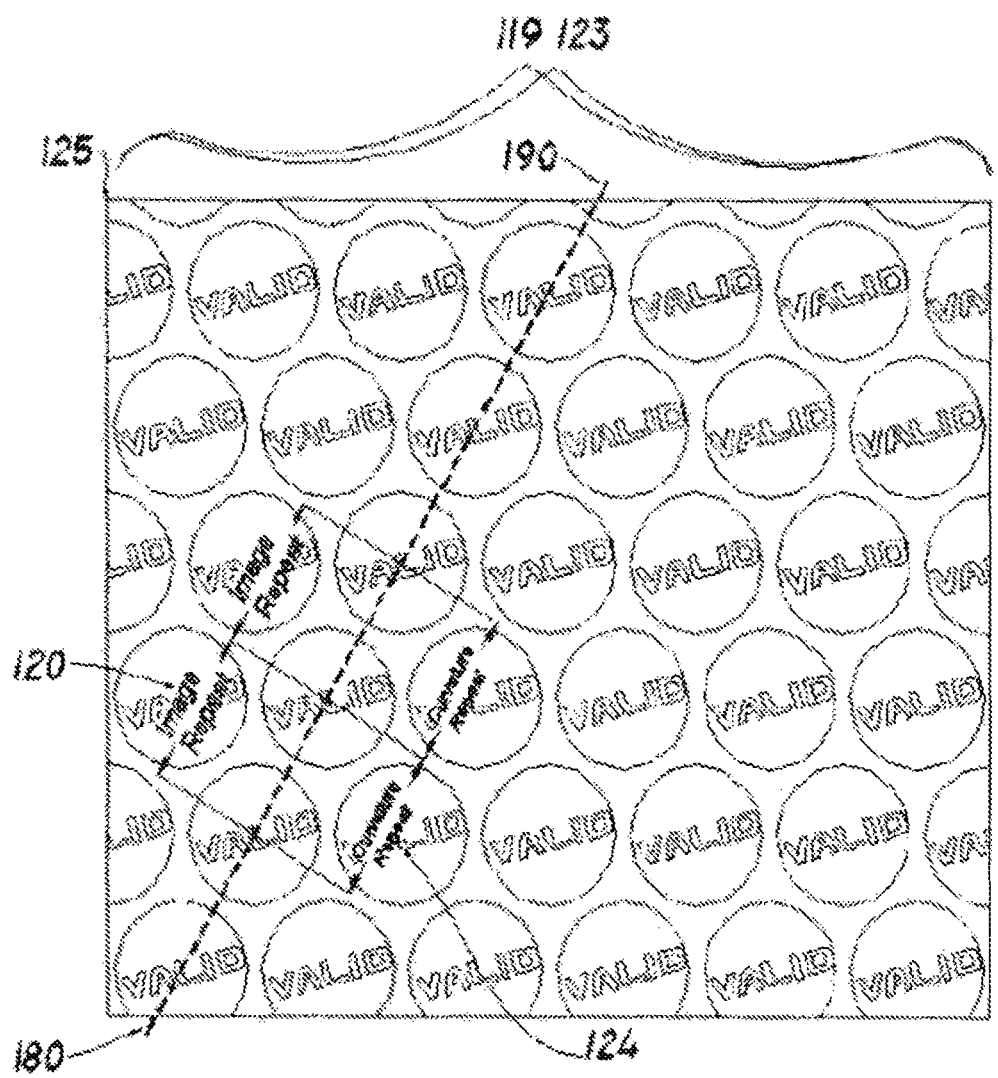
FIG. 6 shows an overlaid image array and curvature array.

FIG. 6 illustrates an overlaid image array 119 and curvature array 123. In this example, the ratio of the first image repeat period 120 to the first curvature repeat period 124 is 1 (i.e., the first image repeat period is equal to the first curvature repeat period). In this embodiment, the image array 119 and the curvature array 123 are aligned such that the first curvature reference axis 190 is parallel and coincident with the first image reference axis 180.

Figure 7:
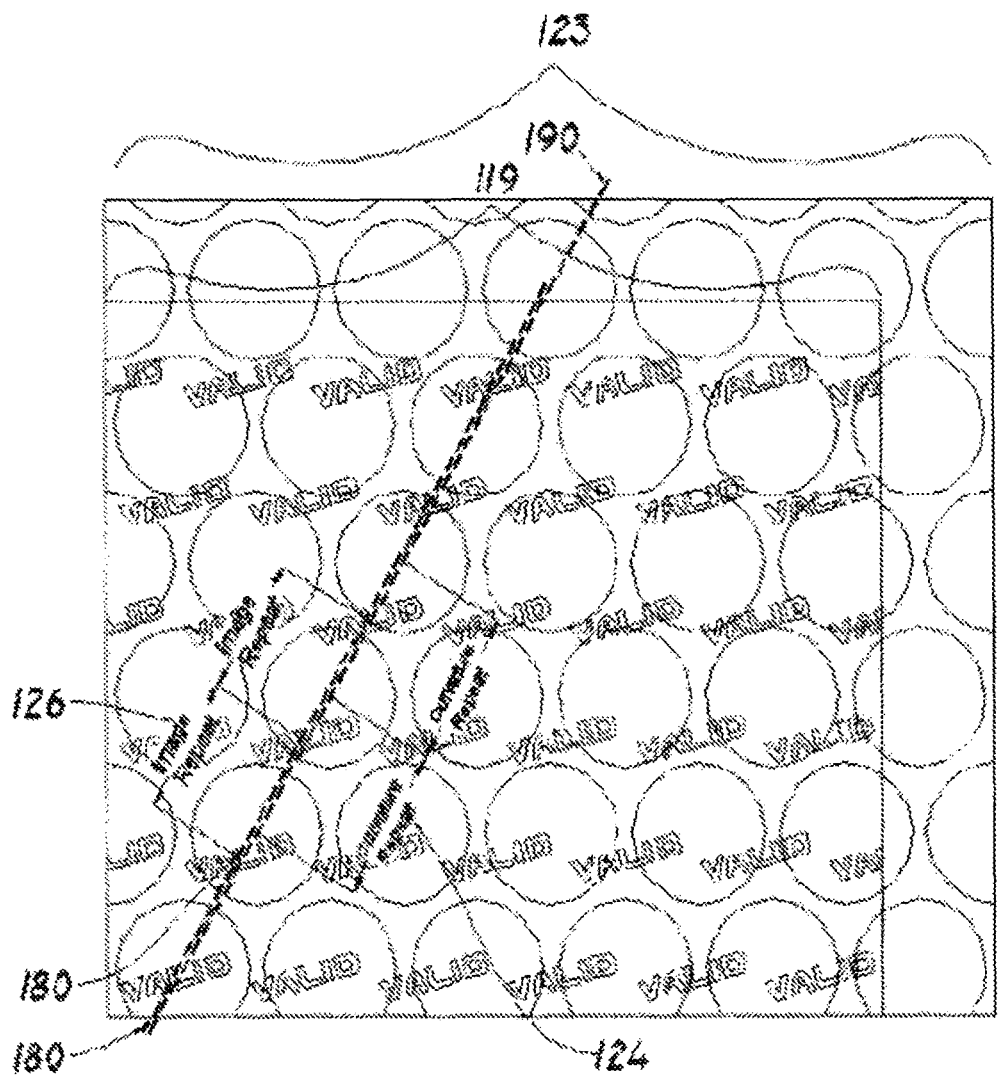
FIG. 7 shows a layer scaling operation. Here, an overlaid image array and curvature array are illustrated, in this example, the image array has a different scaling than the curvature array. Specifically, the image repeat period of the image array is smaller than the curvature repeat period of the curvature array.

FIG. 7 illustrates a layer scaling operation. In this example, the image array 119 has different scaling than the curvature array 123. Specifically, the first image repeat period 126 is smaller than the first curvature repeat period 124, such that the distance between two repeating image elements is smaller than the distance between two curvature elements. This operation will result in a magnified moiré image that appears to lie on a spatial plane beneath the system, once the corresponding ImageArc system is generated.

Depending on the difference in period of the curvature repeat period 124 and image repeat period 126, the resulting magnified moiré image can be direct (right reading, where the textual image appears as "VALID") or reversed (wrong reading, where the textual image appears as "DILAV"). Erect magnified moiré images can be formed in embodiments where the curvature repeat period 124 is larger than the image repeat period 126. Conversely, inverted moiré images can be formed in embodiments where the curvature repeat period 124 is smaller than the image repeat period 126.

Figure 8:
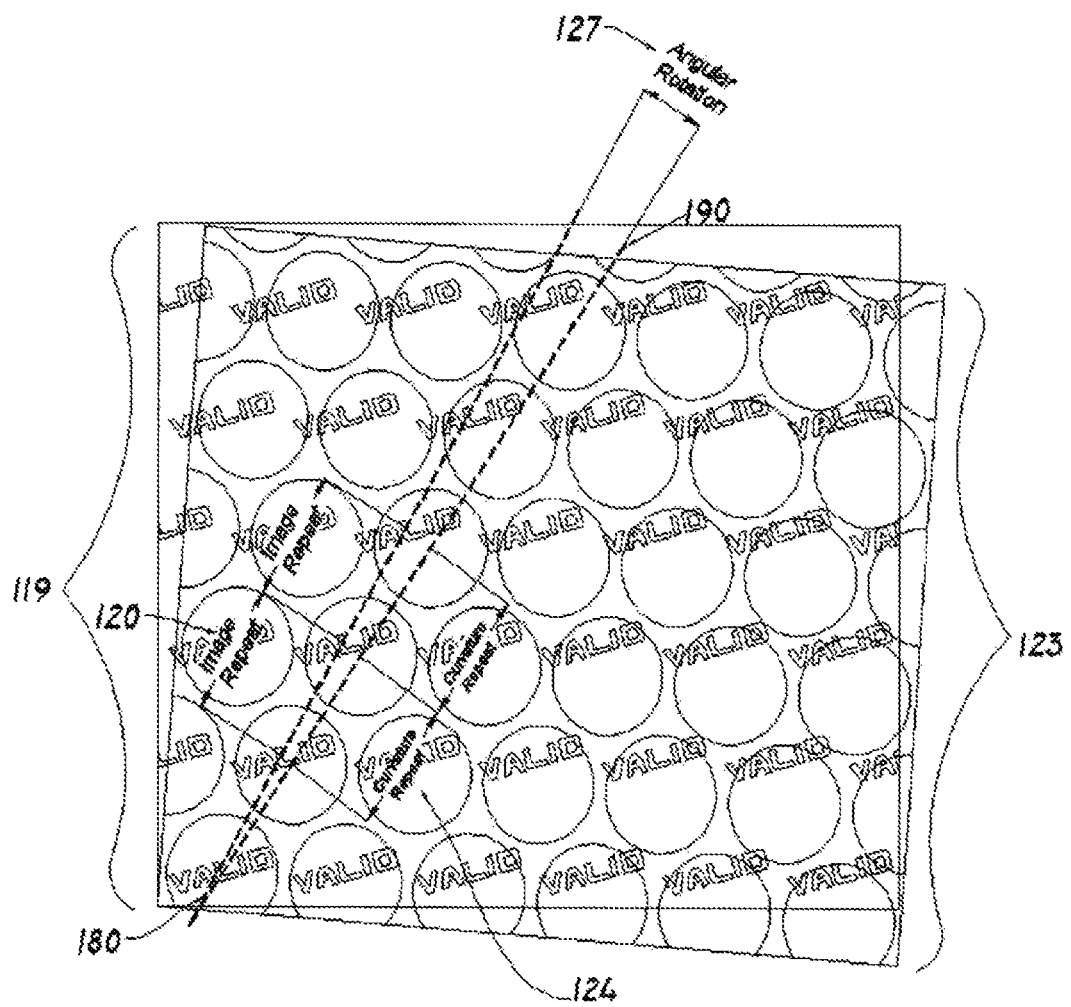
FIG. 8 shows a "skew" operation. Here, an overlaid curvature array is rotated with respect to an image array.

FIG. 8 illustrates a rotation or "skew" operation, in which an overlaid curvature array is rotated with respect to an image array. In this example, the ratio of the first image repeat period 120 to the first curvature repeat period 124 is 1. However, the curvature array 123 is rotated to a degree relative to the image array 119, such that the first curvature reference axis 190 is not parallel to or coincident with the first image reference axis 180. By virtue of the rotation operation 127, the image array 119 will have a new effective pitch, as referenced by the curvature array 123, which is larger than the original image repeat period 120. This new period ratio has the effect of reducing the moiré image size, and provides for images that will appear to move or slide within the plane of the system in the opposite direction of tilt.

While the examples described above employ a single image array for clarity, the moiré magnification systems provided herein can include multiple image arrays, each having their own scale and rotation relative to the curvature array to generate moiré magnification systems exhibiting the visual effects desired for a particular application. For example the array of 'valid' images can be combined with a second image array having an "ok" motif with a different image repeat.

Once the array designs are generated, and their properties manipulated by scale and rotation, the layers will be ready for physical realization, where the image array design(s) and curvature array design can be merged or superimposed into one layer, such that common volumetric regions will be shared between the arrays. Methods of forming the moiré magnification systems provided herein are discussed in more detail below.

The dimensions of the unit cells in the image arrays and curvature arrays described above can be varied, so as to afford moiré magnification systems having the characteristics for a desired application. In some cases, the unit cell defining the image array, as measured between two lattice points on the unit cell, can be less than one millimeter (e.g., less than 250 microns, or less than 150 microns). In some cases, the unit cell defining the image array, as measured between two lattice points on the unit cell, can be at least 1 micron (e.g., at least 10 microns, or at least 25 microns).

In some embodiments, the first image repeat period is from 1 micron to 1000 microns (e.g., from 1 micron to 500 microns, from 1 micron to 250 microns, from 1 micron to 150 microns, from 10 microns to 250 microns, from 10 microns to 250 microns, or from 10 microns to 150 microns), and the first curvature repeat period is from 1 micron to 1000 microns (e.g., from 1 micron to 500 microns, from 1 micron to 250 microns, from 1 micron to 150 microns, from 10 microns to 250 microns, from 10 microns to 250 microns, or from 10 microns to 150 microns).

Depending on the design of the moiré magnification system, systems that display a variety of visual effects can be generated. Example visual effects that can be observed include:

magnified moiré images that appear to lie on a spatial plane beneath the system;

magnified moiré images that appear to lie on a spatial plane above the system;

magnified moiré images that appear to lie on a spatial plane coplanar with the system, and which appear to move or slide orthogonally with translation (e.g., counter-directional sliding);

magnified moiré images that appear to transform from one image form into another;

magnified moiré images that depict an array of similar image motifs (e.g., a wallpaper design);

magnified moiré images that depict a single object or scene and provide unique perspective with viewing angle (e.g., integral imaging, see, for example, U.S. Pat. No. 6,177,953 to Vachette et al., which is hereby incorporated by reference);

magnified moiré images that appear to "turn on and off" (e.g., disappear and reappear) with change in viewing angle.

In some embodiments, the magnified moiré image appears to lie on a spatial plane above or below the moiré-type magnification system. In some embodiments, the magnified moiré image appears to move between a spatial plane beneath the system and a spatial plane above the system upon rotation of the system about an axis perpendicular to the surface. In some embodiments, the magnified moiré image appears to transform from a first form, shape, size or color to a second form, shape, size or color upon rotation of the system about an axis parallel to the surface. In certain embodiments, the magnified moiré image can appear to slide counter-directionally within a plane parallel to or coplanar with the surface upon rotation of the system about an axis parallel to the surface.

Figure 11:
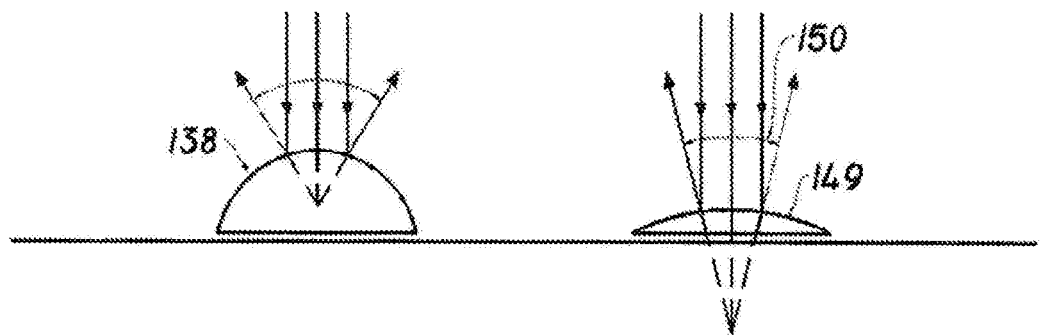
FIG. 11 illustrates the differences in field-of-view that result from employing different curvature profiles.

Many other aspects of the moiré magnification system can be varied to generate moiré magnification systems exhibiting the characteristics and visual effects desired for a particular application. For example, the radius of curvature of the arcuate image generating surfaces present in the image relief microstructures (and by extension the radius of curvature of the periodic surface curvature) can be varied, as desired. As illustrated in FIG. 11, a lower curvature shape 149 will generally provide a narrower field of view 150 than one of higher curvature. The curvature element field of view can provide the range of viewing angles from the light source through which magnified moiré images can be seen observed the viewer. Generally, the narrower the field of view, the brighter the appearance of the magnified moiré images over the included range of angles. Conversely, the broader the field of view, the dimmer the magnified moiré images appear over that field of view.

In some embodiments, the radius of curvature of the arcuate image generating surfaces present in the image relief microstructures (and by extension the periodic surface curvature) can be from 1 micron to 500 microns (e.g., from 1 micron to 250 microns, from 1 micron to 150 microns, from 10 microns to 250 microns, or from 10 microns to 150 microns).

Figure 12:
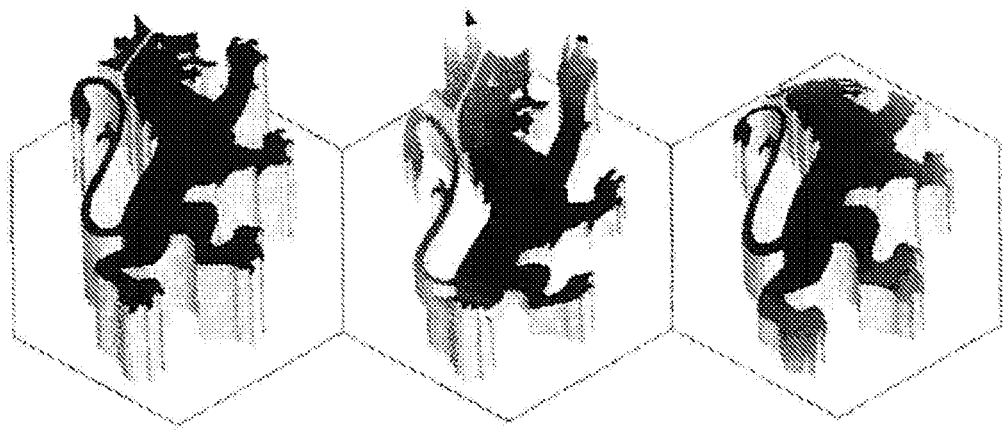
FIG. 12 shows image relief microstructures that have no surface curvature (left), concave surface curvature (center), and convex surface curvature (right).

The arcuate image generating surfaces of the image relief microstructures in the array can have convex or concave periodic surface curvature across the array. In certain embodiments, the periodic surface curvature of the array is convex. In other embodiments, the periodic surface curvature of the array is concave. Convex (positive curvature) features can be said to bulge away from the surface when the elements are viewed from above, as shown in FIG. 12 (right motif). Concave (negative curvature) features can be said to bulge inwards towards the substrate when the elements are viewed from above, as shown in FIG. 12 (center motif). For reference, a structure with no curvature is also illustrated in FIG. 12 (left motif).

In one embodiment, the arcuate image generating surfaces of the image relief microstructures in the array (and by extension the periodic surface curvature) exhibit the contour of a section of a convex hemisphere. For a symmetric convex reflector, the surface of the reflective region presents a mirror image at a focal point lying behind the reflector which, to the viewer, appears as a bright point at a distance of $f=-R/2$, where R is the radius of curvature.

In the examples illustrated above, interstitial spacing is present between curvature array elements for ease of manufacture; however, if desired, an intermediate curvature mold having 100% fill factor can be used to define the periodic surface curvature of the image relief microstructures.

Additionally, cylindrical geometry curvature elements can be used. Cylindrical geometry curvature elements can be used, for example, to produce moiré magnification systems that produce magnified moiré images that exhibit dynamic movement in only one direction of tilt.

The image relief microstructures may be constructed from two dimensional regions which constitute a partial or full portion of an image, number, text, shape, or other motif. When designing the image relief microstructure array for the system, a unit cell can be defined such that the contents of the cell may be arrayed in a periodic two-dimensional space filling configuration, where the unit cell contains at least one instance of a pattern to be repeated, and where it defines the packing structure of the relief elements. The packing structure, or lattice point arrangement, generally defines how the array will be constructed. Such lattice arrangements (the fundamental two-dimensional Bravais lattice arrangements) are known in the art of crystallography and include oblique, rectangular, rhombic, hexagonal, and square packing structures.

In this context, the term periodic array refers to a repeating, two-dimensional, space filling tessellation of unit cells (or repeat patterns) that can be repeated by translation to fill a surface with the contents of the unit cell (e.g., like the tiling of a surface). The periodic array of unit cells can thus have translational symmetry, and their arrangement on the surface can be characterized by a two-dimensional crystallographic lattice arrangement to fundamental two-dimensional Bravais lattice arrangement).

Figure 13:
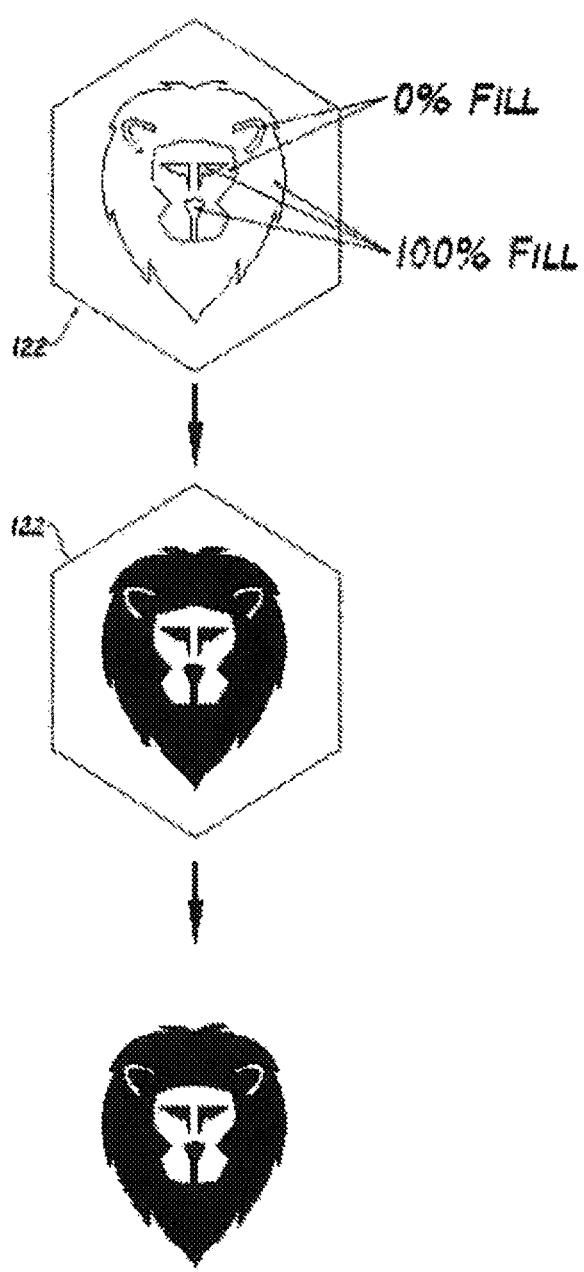
FIG. 13 illustrates an image relief design having binary shading from single unit cell.

The array can be designed to produce a magnified moiré image with a binary shading or light intensity profile and/or a magnified moiré image with multi-level shading. FIG. 13 (top) illustrates a design using two-dimensional closed regions to illustrate a lion face motif. The design is fit into a unit cell 122, and the intent is to use binary shading. To accomplish this, only one unit cell with one instance of the pattern (middle) is required to generate an array that can produce a composite magnified moiré image (bottom) that will also have binary shading or light intensity profile.

Figure 14:
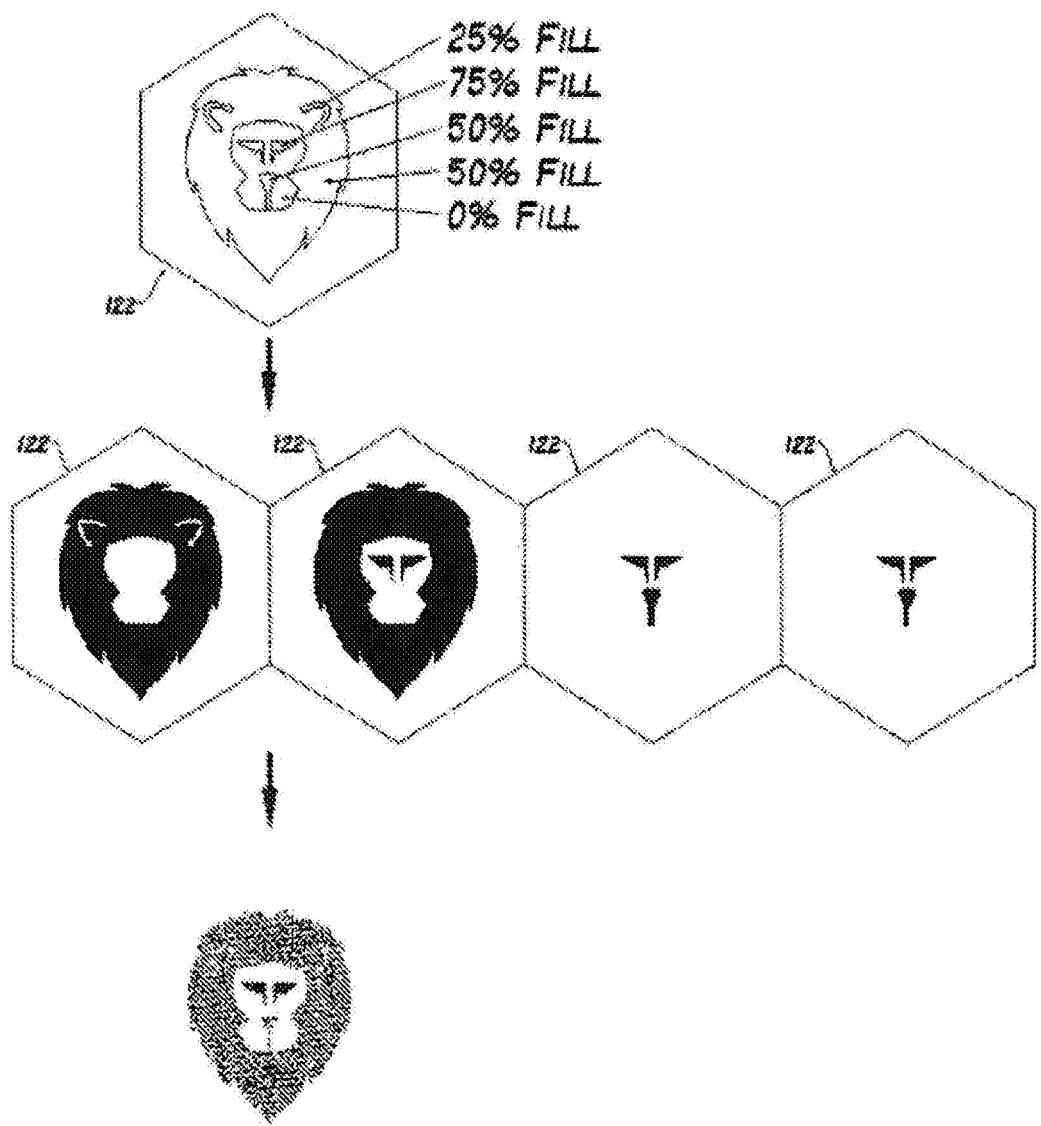
FIG. 14 illustrates an image relief design having multi-level shading from multiple unit cells.

If desired, magnified moiré images with multi-level shading can be generated using arrays defined using multiple unit cells. FIG. 14 illustrates an example where four cells (as opposed to one unit cell) define the image array. If four cells are used to generate the image relief array, then multi-level shading of the composite image can occur. For example, if three out of the four cells contain the eyes of the lion's face, the eyes will appear 75% shaded, or region-filled in the resulting composite magnified moiré image.

Suitable materials for the fabrication of image relief microstructures include, by way of example, metals, ceramics, glasses, and plastics. As described above, the image relief microstructures can operate in reflective mode, in transmissive mode, or in partially reflective and partially transmissive mode to generate a magnified moiré image. The composition of the image relief microstructures can be varied, if desired, to produce a given optical effect.

For example, in the case of moiré magnification systems designed to produce magnified images upon reflection of light from the array, the image relief microstructures can be formed from a reflective material. Suitable reflections can be obtained using image relief microstructures formed from plastics, such as polycarbonate, polyvinyl chloride, ABS, polystyrene, and polyesters that can be molded to obtain mirror-like reflective surface reflection. Suitable reflections can be obtained using image relief microstructures formed from energy curable acrylate materials. In certain embodiments, the arcuate, image generating surfaces of the image relief microstructures can be mirrored. Such highly reflective image relief microstructures can be formed, for example, by metallization (e.g., by vapor deposition of a metal such as aluminum), or by stamping or embossing a reflective material such as a metal foil.

In the case of moiré magnification systems designed to produce magnified images upon transmission of light through the array, the image relief microstructures can be formed from suitable light transmitting material. In this way, the moiré magnification system can produce images that are viewable when backlighting is provided to the reverse of the moiré magnification system, and the moiré magnification system viewed from the front. For example, by holding the moiré magnification system up to the light and viewing (as when checking a banknote for presence of a watermark) the moiré magnification system will produce easily observed images. Partially reflective and partially transmissive materials can also be used, for example by very thin metallic coatings, or by high refractive index materials such as zinc sulfide.

A variety of other materials can be incorporated (e.g., in or on the image relief microstructures, in or on the surface on or within which the image relief microstructures are formed, or a combination thereof) to convey a desirable appearance and/or optical effects. For example, non-fluorescing pigments, non-fluorescing dyes, fluorescing pigments, fluorescing dyes, metal, metal particles, magnetic particles, nuclear magnetic resonance signature materials, lasing particles, organic LED materials, optically variable materials, evaporated materials, sputtered materials, chemically deposited materials, vapor deposited materials, thin film interference materials, liquid crystal polymers, optical upconversion and/or downconversion materials, dichroic materials, optically active materials, optically polarizing materials, optically variable inks or powders, and combinations thereof can be incorporated. The image relief microstructures, the surface on or within which the image relief microstructures are formed, or a combination thereof can also be formed from materials having various appearances (e.g., metallic materials, glossy materials, matte materials, colored materials, transparent materials, opaque materials, fluorescent materials, etc.). By combining image relief microstructures formed from a first material with a surface formed from a second material, contrasting effects (e.g., glossy images on a matte background, matte images on a glossy colored images (transparent or opaque) on a colorless background (transparent or opaque), colorless images (transparent or opaque) on a colored background (transparent or opaque), etc.) can be created.

In some embodiments, the image relief microstructures, the surface on or within which the image relief microstructures are formed, or a combination thereof can comprise subwavelength surface modifications, such as holographic, photonic crystal, or interference coatings. Subwavelength structures can be used to alter the color, reflectivity, and/or absorption of the system. In some embodiments, light diffractive structures and/or photonic crystal structures can be incorporated in or on the image relief microstructures, in or on the surface on or within which the image relief microstructures are formed, or a combination thereof.

In some embodiments, the image relief microstructures, the surface on or within which the image relief microstructures are formed, or a combination thereof can comprise an optically variable ink or powder.

Printing inks may also be incorporated into image relief microstructures, the surface on or within which the image relief microstructures are formed, or a combination thereof. In some embodiments, the system can further comprise traditional print, such as selective overprinting and/or print lying beneath transparent regions of the system. If desired, the linewidth of images (e.g., thin images vs. broad images) can be varied.

Figure 17:
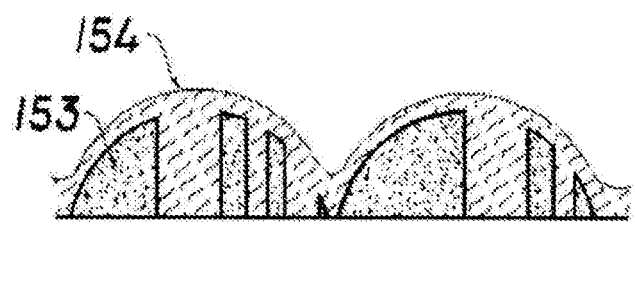
FIG. 17 shows an ImageArc device having an array of (+)-relief image relief microstructures having convex periodic surface curvature. The image relief microstructures are formed from a reflective powder material and over-coated.

If desired, an overcoat can be applied to the system, covering the surface and/or the image relief microarray. The overcoat can be, for example, a glossy overcoat or varnish. FIG. 17 illustrates a moiré magnification system that includes an overcoat covering the array of image relief microstructures. In this example, the image relief microstructures 153 can comprise a microparticulate reflective powder (e.g., the microstructures can be cast from a composition that includes microparticulate reflective powder. An overcoating 154 is provided over the microstructure array.

Figure 15:
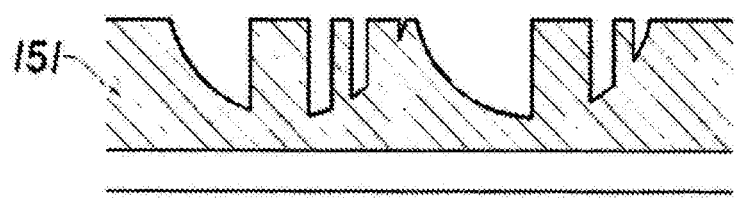
FIG. 15 shows an ImageArc device that includes (−)-relief image relief microstructures having concave periodic surface curvature.

As described above, the image relief microstructures can be (+)-relief or (−)-relief image relief microstructures. As described above, in some cases the image relief microstructures can be (+)-relief image relief microstructures that upwardly project from the surface terminating in an arcuate image generating surface. In other cases, the image relief microstructures can be (−)-relief image relief microstructures that are voids formed within the surface terminating in an arcuate image generating surface. FIG. 15 illustrates an example of a moiré magnification system that includes an array of (−)-relief image relief microstructures. The (−)-relief image relief microstructures are voids formed within the surface 151 terminating in an arcuate image generating surface. The periodic surface curvature of the array illustrated in FIG. 15 is concave.

Figure 16:
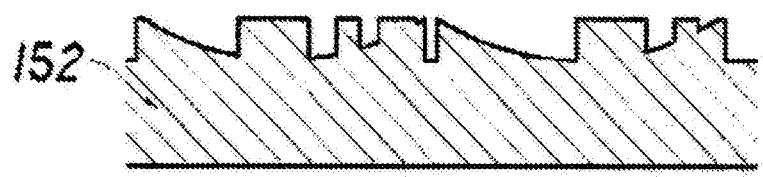
FIG. 16 shows an ImageArc device (−)-relief image relief microstructures having concave periodic surface curvature.

The arcuate image generating surfaces of the image relief microstructures in the array can have convex or concave periodic surface curvature across the array. FIG. 16 illustrates a moiré magnification system that includes (−)-relief image relief microstructures having concave periodic surface curvature. In this example, the microstructures are pressed into a substrate 152 (e.g., embossed or stamped).

Methods of Making

The moiré magnification systems described herein can by formed using photolithographic patterning and microstructure mold making and replication processes known in the art. Using soft mold making to create a hard mold, a hard embossing tool can then be created. Once created, the hard embossing tool can be used, for example, to mold the array structure of the moiré magnification systems into thermoformable plastic substrates or to cast curable polymers onto a substrate. The hard embossing tool can also be used to cast a negative mold onto a plastic carrier which can be filled with a releasable composition that can be transferred to a final substrate (e.g., by a hot stamping or curing process) in a process similar to holographic foil transfer.

Figure 9A:
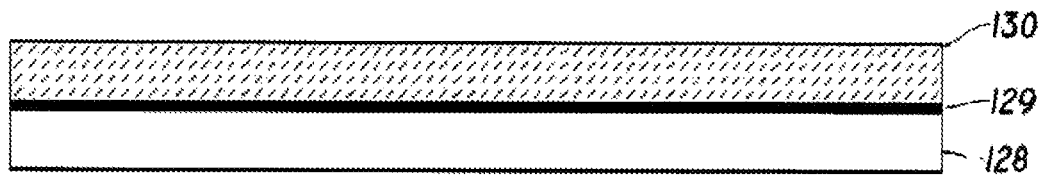
FIGS. 9A-9I illustrate methods for fabricating a master.
Figure 9B:
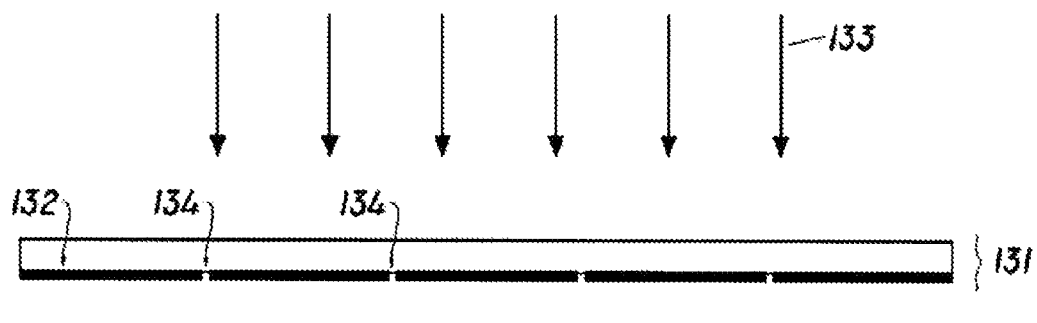
Figure 9C:
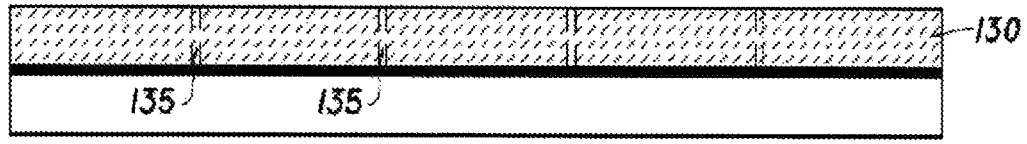

An example method for creating a master is illustrated in FIGS. 9A-9I. FIG. 9A illustrates a smooth glass substrate 128 which is covered by a layer of aluminum 129. On top of the aluminum 129, a layer of positive photoresist 130 is deposited. A chrome on glass photomask 131 with a curvature array pattern 132 is placed in contact with the photoresist 130, as shown in FIG. 9B. The structure is then exposed using collimated ultraviolet light 133, through the clear areas in the mask 134, allowing exposure of the photoresist only in the locations where photoresist is to be removed 135. The glass with photoresist is then placed in caustic developer solution so that the exposed areas are washed away along with the underlying aluminum. The result is photoresist cylinders 136 sitting on aluminum bases 137, where the bases will act as a boundary region that prevents the photoresist from wetting to the glass after heating, as shown in FIG. 9C.

Figure 9D:
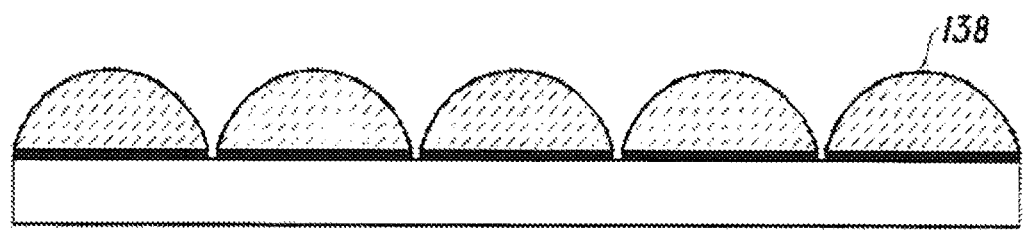
Figure 9E:
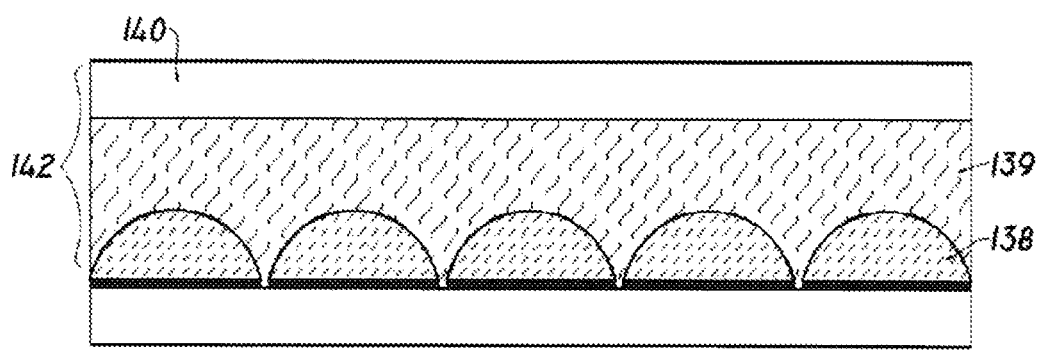

Next the glass is placed on a hotplate in order to melt the photoresist, creating shaped curvature structures 138 from the surface tension of the molten resist, as shown in FIG. 9D. Once cooled, a liquid photopolymer 139 is applied to the surface of the resist shapes 138, as shown in FIG. 9E, followed by a new glass cover substrate 140. The photopolymer is then hardened by flood exposure to ultraviolet light and lifted away from the photoresist structures. The result is soft master that includes an array of concave curvature shapes 141 in photopolymer attached to the new glass substrate. The soft curvature array master 142 can then be used to define the upper surface curvature of the final structure, but requires further processing to introduce the image shapes.

Figure 9F:
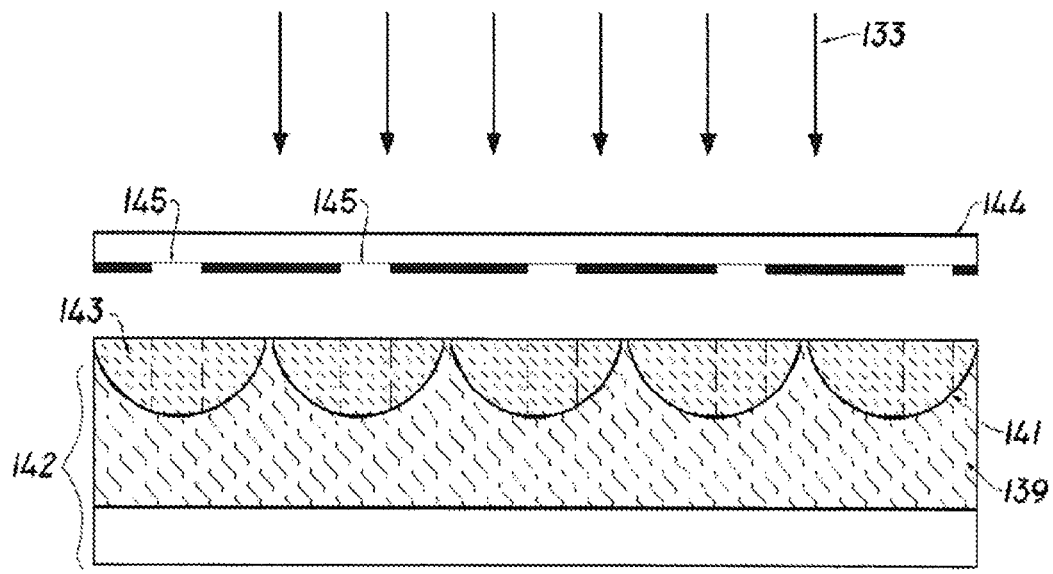

To introduce the image shapes, the concave voids of the soft curvature array master 142 are filled with photoresist 143. A photomask with image region patterning 144 is placed in contact with the photoresist filled soft master and exposed to collimated ultraviolet light 133, as shown in FIG. 9F. In this example, the image areas 145 on the mask are clear with opaque background, allowing exposure of the image areas into the photoresist. The structure is then placed in developer solution, developing away the exposed resist, leaving a negative version of the image array, shown in FIG. 9G.

Figure 9G:
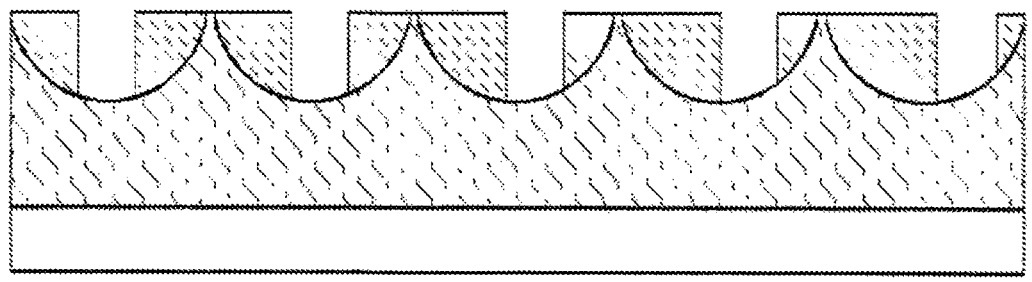
Figure 9H:
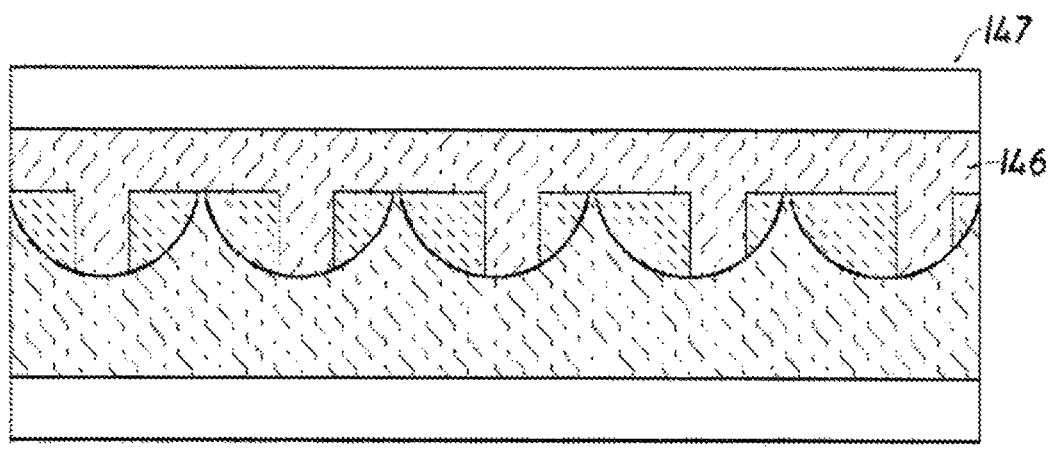

Liquid photopolymer 146 can then be applied along with a glass cover substrate 147, as shown in FIG. 9H. The photopolymer can then be hardened by flood exposure to ultraviolet light, and removed, resulting in a moiré magnification system that includes a periodic array of (+)-relief image relief microstructures having a convex periodic surface curvature, shown in FIG. 9I.

Each image relief microstructure, having in essence been sectioned from a curvature array element with its own characteristics, can be provided with greater or lesser curvature. Different fields of view can be provided by the system by altering the curvature, which can be tailored during the first steps of the mastering process (previously depicted in FIGS. 9A-9D). FIGS. 10A-10D illustrate how the curvature can be altered by providing a thicker or thinner layer of photoresist before patterning. When a thinner layer of photoresist 148 is used, there will be a lower volume of photoresist in an equivalent footprint, resulting in a shallower curvature element 149 after surface tensioning from the reflow process.

Figure 9I:
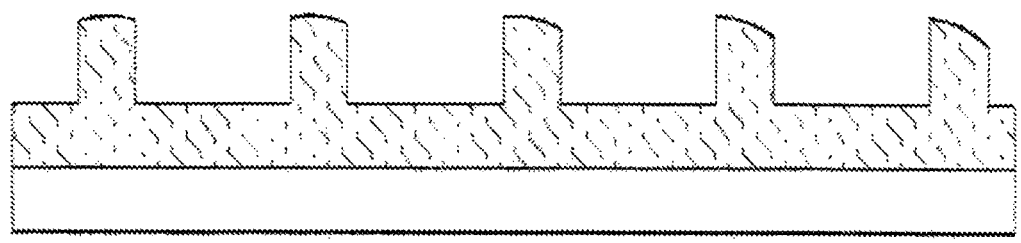
Figure 10A:
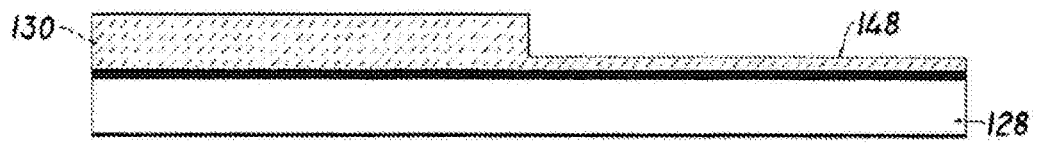
FIGS. 10A-10D illustrate how the curvature can be altered by varying the thickness photoresist prior to patterning.
Figure 10B:
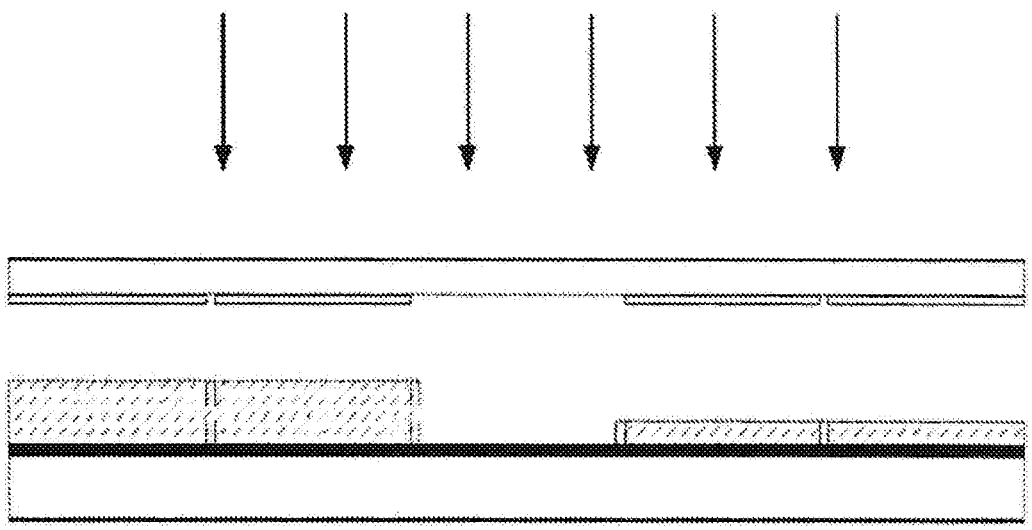
Figure 10C:
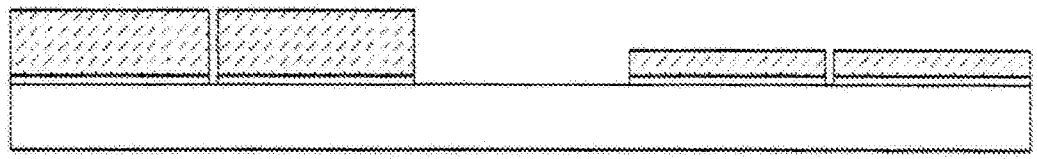
Figure 10D:
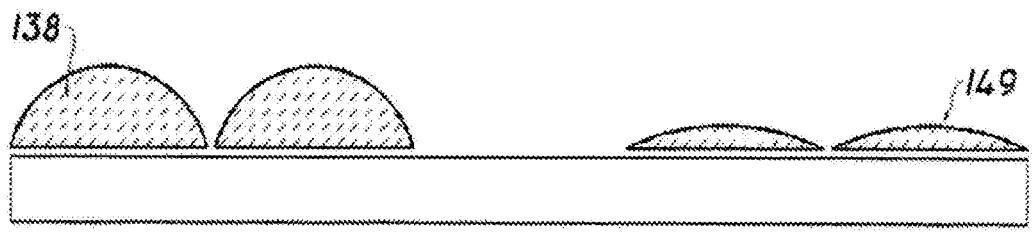

The structures formed in FIGS. 9G and 9I are soft embossing masters, meaning a few replicas of their surfaces can be made (e.g., by filling the soft master with a curable composition, curing the composition, and removing the cured composition of the soft master) before damage is incurred. For a more robust mold, for example that can be used for mass production of a moiré magnification system by hard or soft embossing, a hard master can be prepared and used.

A hard master is a metal embossing mold having a negative version of the desired microstructure, so that when its surface is replicated by embossing or casting, a positive version of the structure may be produced. A hard master can be formed by conductive metallization and electroforming, as is known in the art of DVD manufacturing. By way of example, the soft master illustrated in FIG. 9I can be coated with a thin layer of silver by vapor deposition, provided with electrical contact, and placed in nickel plating solution for electrodeposition. After a sufficient thickness of nickel has plated the surface (for example ¼ or ½ mm in thickness), the plated structure is removed from the solution. The electroformed hard master can then be peeled away from the soft master. A nearly unlimited number of soft embossments of the hard master's surface (a moiré magnification system) can then be made from the surface of the hard master, provided the surface of the hard master remains unscratched or unabraided.

The hard master structure can also be copied onto further hard masters having mirrored structure if the electroforming process is repeated. In DVD mastering, the first nickel master is called the father, and the copies from the father surface are referred to as mothers. The mother can be used in production only if a mirror image of the original is desired. This can be useful if it is desired to switch between concave and convex structures, though text and nonsymmetrical images will be reversed. Otherwise, the mother electroform can be used to generate another electroform known as the son, which will have the same structure as the father, from which soft replicas or embossments can be made that match the structure of the original soft master.

To facilitate the mass production of the moiré magnification system using conventional industrial printing equipment, the hard master father or son can be formed into a cylinder around a rigid core, so as to form a hard embossing cylinder. This cylinder can be used, for example, to continuously impress the moiré magnification system into a web fed substrate by heated embossing, or to cast the moiré magnification system onto a substrate surface using a curable polymer resin, such as an energy curable acrylate resin.

The hard master can be made from electroformed nickel, but is not limited by the material used, as this can vary depending on production requirements. For example, master molds can be made from electroformed copper, or from modern rigid epoxies for light duty manufacturing. A master mold for a moiré magnification system can also be formed by an additive manufacturing process such as 3D printing, provided the resolution is high enough. The print could be used directly or used to make further hard masters.

For heavy duty applications, such as high pressure stamping, a high hardness master die may be needed. To create such a tool, a nickel master mother can be coated with a first soft metal such as silver, which will act as a release layer. Next a layer of titanium nitride can be applied to the surface of the silver, which will impart superior hardness to the final master. The mother may then be placed inside a graphite die mold and the entire assembly heated to reduce effect of thermal shock. Molten carbon steel is then poured into the die mold, onto the face of the TiN coated mother. This can then be allowed to cool slowly or can be heat treated by quenching rapidly in oil to impart a high hardness. Upon cooling, the mold can be broken away, the backside of the steel planarized, and the mother peeled away from the cast steel die, separating at the silver interface. The hardened steel die having a thin layer of titanium nitride can be suitable for some applications where heavy duty stamping or metal casting is employed.

Also provided is a system for embellishing a surface (e.g., a surface of a commercial product, such as a papers, polymeric, ceramic, or metallic surface) for the purpose of authentication or aesthetic improvement. The embellishing system can comprise a hard master that comprises a moiré magnification system, as described herein. The embellishing system can be used to form a moiré magnification system, as described herein, on the surface in one or more of the following ways:

By positive embossment of the substrate material from which the commercial product is formed (i.e., to form a (+)-relief image relief microstructure array on the surface of the substrate material);

By negative embossment to form voids (i.e., a (−)-relief image relief microstructure array) within the substrate material from which the commercial product is formed;

By positive casting of additional material applied onto the surface of the commercial product (i.e., to form a (+)-relief image relief microstructure array on the surface of the substrate material);

By negative casting of additional material, including a (−)-relief image relief microstructure array formed within the additional material.

Methods of Use

The moiré-type magnification systems can be provided in a variety of forms, depending on the intended application for the system. In certain embodiments, the moiré-type magnification systems can be formed on an article or packaging for the article, for example, by embossing, casting, molding, or stamping the array of image relief microstructures on the article or packaging for the article. In certain embodiments the moiré-type magnification systems can be formed on a substrate (e.g., a polymer film or metallic foil) that can be applied to an article or packaging for the article (e.g., using an adhesive). The precise methods whereby the moiré magnification systems are formed can be selected in view of a number of factors, including the nature of the substrate on or within which the system is formed, and overall production considerations (e.g., such that the method readily integrates into the manufacture of an article).

The moiré-type magnification systems can be employed to provide authentication of articles (e.g., as a security and anti-counterfeiting feature to identify and distinguish authentic products from counterfeit products) and/or to provide visual enhancement of manufactured articles and packaging. The systems can be employed in many fields of use and applications. Examples include:

Government and defense applications—whether Federal, State or Foreign (such as Passports, ID Cards, Driver's Licenses, Visas, Birth Certificates, Vital Records, Voter Registration Cards, Voting Ballots, Social Security Cards, Bonds, Food Stamps, Postage Stamps, and Tax Stamps);

currency—whether Federal, State or Foreign (such as security threads in paper currency, features in polymer currency, and features on paper currency);

documents (such as Titles, Deeds, Licenses, Diplomas, and Certificates);

financial and negotiable instruments (such as Certified Bank Checks, Corporate Checks, Personal Checks, Bank Vouchers, Stock Certificates, Travelers' Checks, Money Orders, Credit cards, Debit cards, ATM cards, Affinity cards, Prepaid Phone cards, and Gift Cards);

confidential information (such as Movie Scripts, Legal Documents, Intellectual Property, Medical Records/Hospital Records, Prescription Forms/Pads, and "Secret Recipes");

product and brand protection, including Fabric & Home Care (such as Laundry Detergents, fabric conditioners, dish care, household cleaners, surface coatings, fabric refreshers, bleach, and care for special fabrics);

beauty care (such as Hair care, hair color, skin care & cleansing, cosmetics, fragrances, antiperspirants & deodorants, feminine protection pads, tampons and pantiliners);

baby and family care (such as Baby diapers, baby and toddler wipes, baby bibs, baby change & bed mats, paper towels, toilet tissue, and facial tissue);

health care such as Oral care, pet health and nutrition, prescription pharmaceuticals, over-the counter pharmaceuticals, drug delivery and personal health care, prescription vitamins and sports and nutritional supplements; prescription and non-prescription eyewear; Medical devices and equipment sold to Hospitals, Medical Professionals, and Wholesale Medical Distributors (e.g., bandages, equipment, implantable devices, surgical supplies);

food and beverage packaging;

dry goods packaging;

electronic equipment, parts & components;

apparel and footwear, including sportswear clothing, footwear, licensed and non-licensed upscale, sports and luxury apparel items, fabric;

biotech pharmaceuticals;

aerospace components and parts;

automotive components and parts;

sporting goods;

tobacco Products;

software;

compact disks, DVDs, and Blu-Ray discs;

explosives;

novelty items (such as gift wrap and ribbon)

books and magazines;

school products and office supplies;

business cards;

shipping documentation and packaging;

notebook covers;

book covers;

book marks;

event and transportation tickets;

gambling and gaming applications (such as Lottery tickets, game cards, casino chips and items for use at or with casinos, raffle and sweepstakes);

home furnishing (such as towels, linens, and furniture);

flooring and wallcoverings;

jewelry & watches;

handbags;

art, collectibles and memorabilia;

toys;

displays (such as Point of Purchase and Merchandising displays); and product marking and labeling (such as labels, hangtags, tags, threads, tear strips, over-wraps, securing a tamperproof image applied to a branded product or document for authentication or enhancement, as camouflage, and as asset tracking).

In certain embodiments, the moiré-type magnification systems can be employed on a document or packaging for a document. The document can be, for example, a banknote, a check, a money order a passport, a visa, a vital record (e.g., a birth certificate), an identification card, a credit card, an atm card, a license, a tax stamp, a postage stamp, a lottery ticket, a deed, a title, a certificate, or a legal document. In some embodiments, the moiré-type magnification systems can be employed to provide visual enhancement of an article, such as coinage, CDs, DVDs, or Blu-Ray Discs, or packaging, such as aluminum cans, bottles (e.g., glass or plastic bottles), plastic film, or foil wrappers.

Example prophetic methods of manufacture are described in more detail below.

1. Embossing of Paper Substrates

In an example method of manufacture, a web fed paper substrate having a thermoformable polymeric coating is passed between a heated hard embossing cylinder for a moiré magnification system and a smooth nip cylinder for applying uniform pressure. The heat and rolling pressure cause the thermoformable polymeric coating to flow into the master cylinder mold and, upon separation, the paper will have the moiré-type magnification systems embossed or impressed into its coating. This method can be used, for example, to provide moiré-type magnification systems on or within papers that have been varnished or provided with anti-soil coatings.

2. Embossing of Polymeric Film Substrates

In an example method of manufacture, a web fed biaxially oriented polypropylene film (BOPP) is hot embossed with a hard master for a moiré magnification system. This method can be used, for example, to produce a moiré magnification system on or within a polymer currency substrate, or to prepare labels that include a moiré magnification system.

3. Embossing of Metallic Film Substrates

In an example method of manufacture a polymeric film (e.g., PET or BOPP), optionally having a thermoformable layer and having a reflective metal layer, or reflective color shift layers, are hot embossed with a hard master for a moiré magnification system, such that the moiré magnification system is formed on or within the thermoformable layer and/or film, with the reflective metallic layer, or reflective color shift layers following periodic surface curvature of the image relief microstructures. The substrate can be, for example, a pre-existing base film used in the manufacture of holograms.

4. Casting on Metallic Film Substrates

In an example method of manufacture, a polymeric film having a metallic reflective coating, or having a color shifting reflective coating (such as color shift interference films that change color with tilt), is used as a substrate. The moiré magnification system is cast on top of the reflective or color shift layers using UV curable resin and a strong UV curing source that can penetrate the metallic layer.

5. Casting on Polymeric Substrates

In an example method of manufacture, a polymeric film (e.g., PET) can be used as a substrate and acrylate based UV curable resin can be used to cast the moiré magnification system from a hard embossing cylinder for a moiré magnification system. The casting can involve UV curing and releasing the curable resin from the master in a continuous process. The resulting moiré magnification system can then be metalized, and applied to a final substrate (e.g., an article or packing for an article) with an adhesive.

6. Casting Using Microparticulate Powders

In an example method of manufacture, the moiré magnification system can be formed from the master using a micro- or nano-particulate reflective powder composition. This opens up a wide field of applications where optically variable inks or powder compositions (OVIs) are used, and allows OVI's to be delivered to a substrate in a pattern that results in a moiré magnified composite image. By gravure-like doctor blading of the particulate inks into a master cylinder having negative representations of the final moiré magnification system, the inks can be 'demolded' or cast onto a substrate, so that the precise microstructure is imparted into the surface of the OVI, resulting in a more spectacular reflection profile than the static inks alone. This OVI molding can also be combined with magnetic domain oriented particles.

7. Molding or Casting Using Microparticulate Powders

In an example method of manufacture, a paper or plastic substrate can be provided with that includes an unpatterned region (i.e., a microstructurally unpatterned surface, in other words; macro shapes are included here) comprising a micro- or nanoparticulate powder containing composition, such as an OVI composition. The moiré magnification system can subsequently be patterned or embossed on or within the micro- or nanoparticulate powder containing composition using a hard master with applied pressure and/or heat.

8. Casting Using Microparticulate Powders with an Overcoat

In an example method of manufacture, reflective powder containing compositions, such as titanium dioxide in UV curable acrylic resin, can be doctor bladed into the a master for the moiré magnification system, and transferred to a paper or plastic substrate by UV curing, forming a moiré magnification system on the surface. The entire surface may then be overcoated or varnished with a clear composition, such as UV curable acrylic, to impart a glossy finish that sharpens the reflection profile and appearance of the magnified moiré image formed by the moiré magnification system.

9. Casting Transparent Structures Using Microparticulate Powders

In an example method of manufacture, a substrate having been coated with a titanium dioxide containing composition or other reflective powder containing composition, can have a transparent moiré magnification system cast on top of the reflective powder containing composition, such that the brightness of the magnified moiré image formed by the moiré magnification system is enhanced.

10. Stamping of Metal Substrates

In an example method of manufacture, a heat treated steel master die for the moiré magnification system can be used to forge stamp the moiré magnification system into soft metals, such as aluminum beverage can lids or coins.

11. Stamping of Foils

In an example method of manufacture, a master for the moiré magnification system can be used to emboss the moiré magnification system into aluminum foil or into aluminum/polymer composite substrates, such as those conventionally used for chewing gum wrappers, foil blister packs (e.g., the foil backings of blister packs used for pharmaceuticals), food packaging, and beauty care product packaging.

12. Molding or Casting an Adhesive Material

In an example method of manufacture, a transparent film having a dry extruded adhesive is provided. An master embossing cylinder for the moiré magnification system can be used to emboss a (−)-relief array of image relief microstructures in the pliable adhesive. Next, a reflective ink composition or a tinted UV curable resin can be doctor bladed into the voids formed in the adhesive surface. A security laminate is thus created having a moiré magnification system embedded within the adhesive. This laminate can then be bonded to a security document with heated lamination, encapsulating the moiré magnification system between overlaminate and the document, such that attempts to tamper with the laminate will destroy or disrupt the moiré magnification system.

13. In-Mold Decoration

In an example method of manufacture, a master for the moiré magnification system can be used for in-mold decoration or embellishment during plastic extrusion, injection molding, vacuum forming, blow molding, die casting or other forms of molding plastic. For example, a plastic water bottle mold can have the moiré magnification system structure molded into the bottom of the bottle to indicate that the bottle is BPA-free and is not a counterfeit.

As noted above, in other contemplated embodiments the microstructures do not extend from an arcuate image generating surface to a planar optical surface but instead start or terminate somewhere between these surfaces. More specifically, the single layer image projection system in these other contemplated embodiments comprises a material layer, which is made up of an arrangement of optionally reflective arcuate elements having an upper arcuate surface, a lower surface, and an arcuate area bounded by the upper arcuate and lower surfaces, and an optionally reflective pattern of image relief microstructures disposed on or within at least some of the upper arcuate surfaces of the arcuate elements. The arcuate elements may have upper arcuate surfaces that are curved surfaces such as sine wave surfaces, egg-crate shaped structures, structures with elliptical, parabolic, hyperbolic, or other non-spherical cross sections, as well as structures with spherical cross sections. The arrangement of optionally reflective arcuate elements and the optionally reflective pattern of image relief microstructures are in a single layer and interact to project one or more images. For an upper arcuate surface with convex face curvature, the image relief microstructures extend downwardly from this surface terminating within the arcuate area distal from the lower surface, and for an upper arcuate surface with concave surface curvature, the image relief microstructures extend upwardly from this surface terminating within an area defined by the curvature of the upper arcuate surface. In a preferred embodiment, the arcuate elements and the image relief microstructures are arranged in repeating patterns and interact to project one or more images (e.g., one or more magnified moiré images).

In one such preferred embodiment, the inventive single layer image projection system projects one or more magnified moiré images. The inventive system comprises a repeating pattern of optionally reflective arcuate elements having an upper arcuate surface, a lower surface, and an arcuate area bounded by the upper arcuate and lower surfaces, and an optionally reflective repeating pattern of image relief microstructures disposed on or within at least some of the upper arcuate surfaces of the arcuate elements. As noted above, for an upper arcuate surface with convex surface curvature, the image relief microstructures extend downwardly from this surface terminating within the arcuate area distal from the lower surface, and for an upper arcuate surface with concave surface curvature, the image relief microstructures extend upwardly from this surface terminating within an area defined by the curvature of the upper arcuate surface.

The inventive single layer image projection system relies on principles of specular reflection. As such, arcuate image generating surfaces of the inventive single layer image projection system may be any type of repeating curved surface and are not limited to focusing elements (e.g., lenses).

The preferred dimensions of the upper arcuate surfaces and the repeat period of these surfaces (e.g., radius of curvature of each upper arcuate surface (preferably from about 1 micron to about 500 microns), size of each upper arcuate surface (measured between two lattice points on the surface) (preferably less than about one millimeter), the upper arcuate surface pattern's repeat period (preferably from about 1 micron to about 1000 microns), etc.) are described above. In addition, the scale ratios (i.e., the ratio of the repeat period of image relief microstructures to the repeat period of the upper arcuate surfaces) and necessary axial alignment or misalignment of the repeating patterns for achieving different optical effects is also described above.

Interstitial space between each upper arcuate surface in the repeating pattern used in the present invention is preferably from about 0 to about 2 microns for micro-scale systems with a total thickness of less than about 100 microns, while interstitial space in inventive macro-scale systems is typically greater in size, preferably greater than about 10 millimeters.

The upper arcuate surfaces and image relief microstructures (or portions thereof) may be rendered reflective to darken the projected image(s). For example, the profiles of the concave or convex upper arcuate surfaces and microstructures (or portions thereof) may be provided with a reflecting metal layer (e.g., a vapor deposited metal layer). Instead of a fully opaque reflecting metal layer, a semitransparent (or partially metalized) metal layer, or a high refractive index layer can be provided. Furthermore, multiple layers of vapor deposited material may be used to provide reflectivity, for example, color-shifting interference coatings formed from dielectric layers, or from a combination of metal and dielectric layers such as metal/dielectric/metal may also provide the necessary reflectivity.

These reflective (metalized) embodiments work off the principle of reflection as opposed to scattering and refraction. The ideal illumination is a point light source (like a clear day sky). The projected image(s) will typically be the color of the reflective material and/or illumination source. If the upper arcuate surfaces are made out of a material that is already colored or reflective, however, then the background of the projected image(s) may take on this character.

When the upper arcuate surfaces and image relief microstructures are not rendered reflective, the projected image(s) will be weak, but discernable. This allows for covert images to be hidden within the inventive single layer image projection system as well as in multi-layer image projection systems. In one such embodiment, a patterned metallization process (or a patterned demetallization process) is used to form zones (i.e., metalized zones) on the upper arcuate surfaces where the projected image(s) (and any of its various effects) is apparent. The metalized zones would be intermingled with zones (i.e., non-metalized zones) where the projected image(s) is less apparent or weak, but discernable. In another such embodiment, the inventive single layer system and a multi-layer image projection system are combined or integrated into a single device (e.g., security strip, thread or patch) in, for example, a side-by-side or alternating arrangement. Examples of such multi-layer image projection systems are described in U.S. Pat. No. 7,333,268 to Steenblik et al., U.S. Pat. No. 7,468,842 to Steenblik et al., and U.S. Pat. No. 7,738,175 to Steenblik et al. In this embodiment, depressions or voids may also be incorporated into focusing elements (e.g., refractive lenses, reflective lenses) of the multi-layer system, and metalized zones and non-metalized zones may be used on the multi-layer system to provide areas where the projected image(s) resulting from the depressions or voids is apparent and areas where the projected image(s) is less apparent or weak, but discernable. Such a device, whether made up of only the inventive single layer system or a combination of the inventive single layer system and a multi-layer system is a complex structure and extremely tamper resistant.

The image relief microstructures used in the practice of the present invention are arranged in relation to the arcuate elements to provide one or more projected images. For reflective embodiments, image relief microstructures and upper arcuate surfaces are engineered so that the reflection of light is the source of the image(s). In other words, the size, depth, roughness, number and location of the image relief microstructures, as well as the curvature of the upper arcuate surfaces are engineered to achieve this result.

General relationships between these parameters are as follows:
  (a) Curvature of the upper arcuate surfaces: a higher curvature relates to a slower movement of a specular reflection spot against a surface, which means that a system with upper arcuate surfaces with a lower curvature can be made to have "faster moving" images.
  (b) The size, depth, and roughness of the depressions or voids are interrelated variables. But in general:
     (i) "larger" depressions (in terms of width along the length of the system) will form larger projected images;
     (ii) "deeper" depressions can lead to higher contrast edges on the projected images. However, if they are very deep they may have a similar effect as a rough depression (as described below); and
     (iii) "rough" depressions (i.e., depressions having an uneven or irregular surface; not smooth or level) form higher contrast projected images. The rougher the depression (the less that it reflects light as opposed to scattering it) the sharper the resulting image. This causes essentially a bright background and a dark image. The degree of light scattering from each depression may be used to measure the depression's level of roughness.

The (−)-relief image relief microstructures (i.e., depressions or voids) may be formed with substantially vertical (or slanted) sidewalls leading down to either a horizontal or curved "lower" surface. Advantageously, it has been found that slanted sidewalls (especially obtusely slanted sidewalk), like shallow voids, facilitate ease of removal of the inventive single layer system from a mold cavity. The sidewalls and "lower" surfaces may be smooth or rough in texture. The depressions or voids may be coated and/or partially or completely filled with another material (e.g., a pigmented material(s)). The size, form, shape and color of the depressions are not limited. In fact, embodiments are contemplated in which two or more types of depressions or voids (e.g., micro- and nano-sized voids) are used.

The (+)-relief image relief microstructures may also be formed with substantially vertical (or slanted) sidewalls, which extend down from or lead up to either a horizontal or curved surface. Again, slanted sidewalk, especially obtusely slanted sidewalls, like shallow voids, facilitate ease of removal of the inventive single layer system from a mold cavity. The sidewalls and "upper" or "lower" surfaces may be smooth or rough in texture and the size, form, shape and color of the (+)-relief image relief microstructures is not limited. The areas surrounding the (+)-relief image relief microstructures may be coated and/or partially or completely filled with another material (e.g., a pigmented material(s)).

It is not necessary in the practice of the present invention for the image relief microstructures to be the same or to be disposed on or within every upper arcuate surface. Instead, for example, the same or different image relief microstructures may be disposed on or within upper arcuate surfaces in select regions or zones of the repeating pattern of these surfaces.

Figure 18:
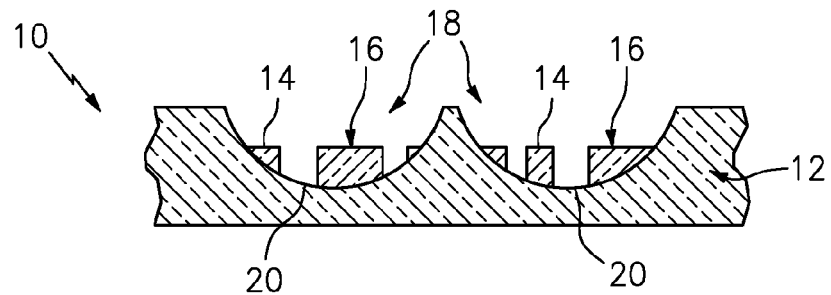
FIG. 18 is a cross-sectional view of another contemplated embodiment in which the single layer image presentation system includes an arrangement of optionally reflective arcuate elements having an upper arcuate surface with a concave surface curvature, a lower surface, and an arcuate area bounded by the upper arcuate and lower surfaces. (+)-relief image relief microstructures extend upwardly from the upper arcuate surfaces, terminating to form horizontal "upper" surfaces within areas defined by the curvature of the upper arcuate surfaces.
Figure 19:
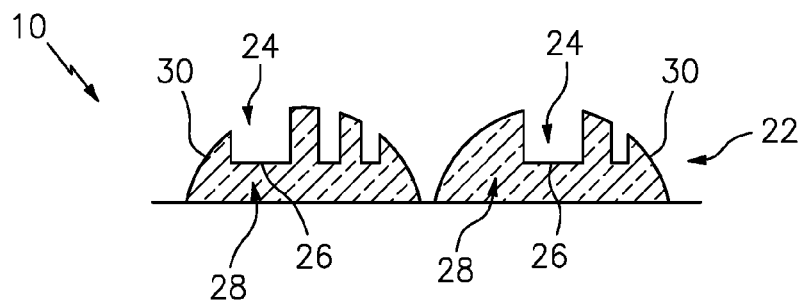
FIG. 19 is a cross-sectional view of yet another contemplated embodiment in which the single layer image presentation system includes an arrangement of optionally reflective arcuate elements having an upper arcuate surface with a convex surface curvature. (−)-relief image relief microstructures extend down from these surfaces terminating to form horizontal "lower" surfaces within the arcuate area.

Two embodiments of the inventive system are shown in FIGS. 18 and 19. In FIG. 18, the system 10 includes an arrangement in the form of a pattern of arcuate elements 12 having upper arcuate surfaces 20 with a concave surface curvature. (+)-relief image relief microstructures 14 extend upwardly from the upper arcuate surfaces 20 terminating to form a horizontal "upper" surface 16 within areas 18 defined by the curvature of the upper arcuate surfaces 20. While not depicted in FIG. 18, it is also contemplated that the image relief microstructures extend downward from upper arcuate surface 20 to a location within the arcuate area that is distal from the lower surface. In FIG. 19, the system 10 includes a pattern of arcuate elements 22 having upper arcuate surfaces 30 with convex surface curvature. (−)-relief image relief microstructures 24 extend down from these surfaces terminating to form horizontal "lower" surfaces 26 within arcuate areas 28. While not depicted in FIGS. 18 and 19, but as noted above, the image relief microstructures disposed on or within at least some of the upper arcuate surfaces may have different sizes, forms, shapes, colors and/or levels of reflectivity.

Figure 20:
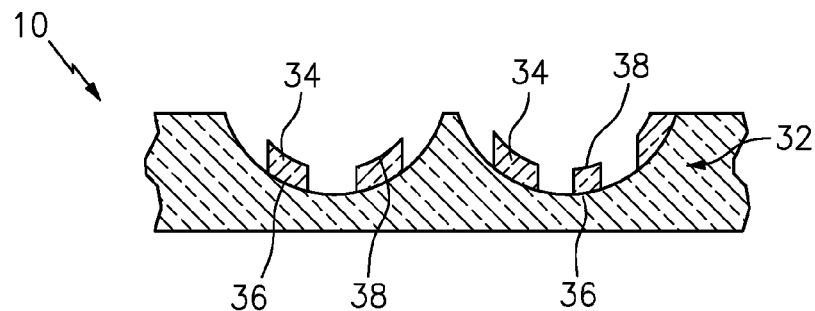
FIG. 20 is a cross-sectional view of another contemplated embodiment, which is similar to the system shown in FIG. 18. The (+)-relief image relief microstructures, however, terminate to form a second arcuate or curved surface that is parallel to the upper arcuate surfaces.
Figure 21:
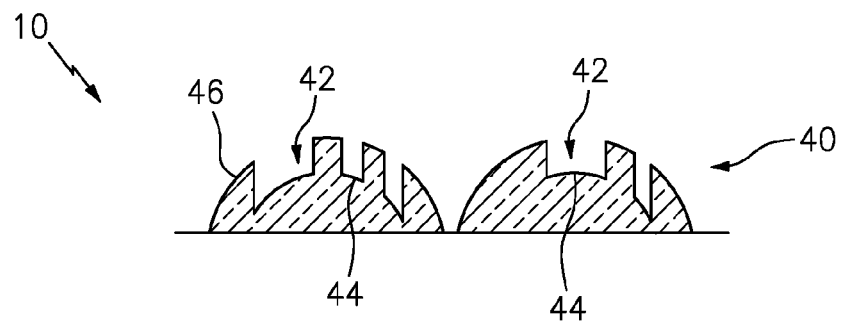
FIG. 21 is a cross-sectional view of another contemplated embodiment, which is similar to the system shown in FIG. 19. The (+)-relief image relief microstructures, however, terminate to form a second arcuate or curved surface that is parallel to the upper arcuate surfaces.

Two more embodiments of the inventive system are shown in FIGS. 20 and 21. In FIG. 20, the system 10 includes a pattern of arcuate elements 32 having upper arcuate surfaces 36 with a concave surface curvature. (+)-relief image relief microstructures 34 extend upwardly from upper arcuate surfaces 36 terminating to form a second curved surface 38 that is substantially parallel to the upper arcuate surfaces 36. In a preferred embodiment, these surfaces are parallel.

In FIG. 21, the system 10 includes a pattern of arcuate elements 40 having upper arcuate surfaces 46 with convex surface curvature. (−)-relief image relief microstructures (depression or voids) 42 extend down from these surfaces terminating to form a second curved surface 44 that is substantially parallel to upper arcuate surfaces 46 (i.e., a first arcuate or curved surface). In a preferred embodiment, these surfaces are parallel. In both of these embodiments, the first and the second curved surfaces reflect light radially thereby providing improved optical effects in the form of images that have dark edges, with bright interiors and bright exteriors (like an outline drawing). These optical effects may be further improved by using "rougher" depressions, which will provide clearer images having more consistent sharpness.

Figure 22:
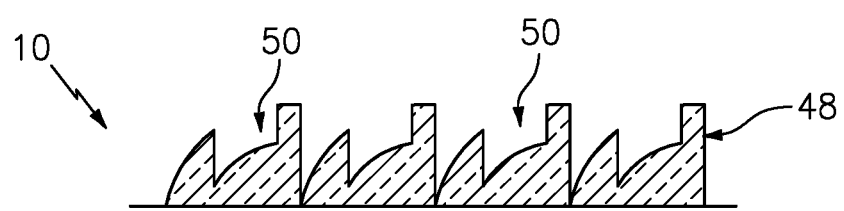
FIG. 22 is a cross-sectional view of yet another contemplated embodiment, where instead of full hemispheres, the convex arcuate image generating surfaces are partial convex hemispheres.

In FIG. 22, a pattern of arcuate elements 48 having upper arcuate surfaces with convex surface curvature is shown. Unlike the earlier embodiments, the arcuate elements 48 in FIG. 22 are not full convex hemispheres but instead are partial convex hemispheres. When viewing this system from the side facing image relief microstructures 50, the system will project one or more bright images, but when viewed from the side facing away from these microstructures 50, the system will either project no image or one or more weak images.

Figure 23:
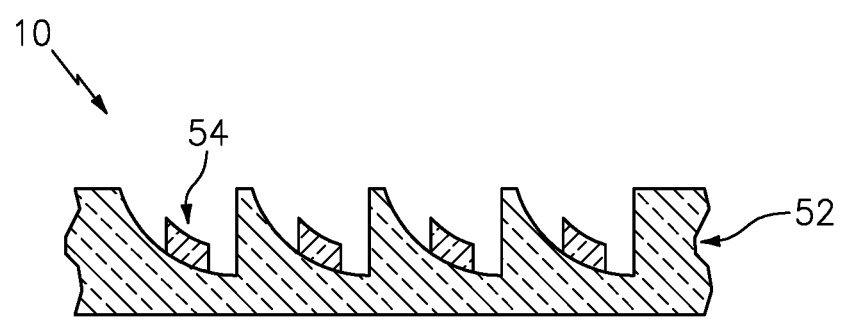
FIG. 23 is a cross-sectional view of yet another contemplated embodiment, where instead of full hemispheres, the concave arcuate image generating surfaces are partial concave hemispheres.

In FIG. 23, a pattern of arcuate elements 52 having upper arcuate surfaces with concave surface curvature is shown. Here, the arcuate elements 52 are not full concave hemispheres but instead are partial concave hemispheres. As above, when viewing this system from the side facing image relief microstructures 54, the system will project one or more bright images, but when viewed from the side facing away from these microstructures 54, the system will either project no image or one or more weak images.

While the upper surfaces of the (+)-relief image relief microstructures and the lower surfaces of the (−)-relief image relief microstructures are shown in FIGS. 18-23 as being level or on the same plane, this is not necessary for the practice of the present invention.

The single layer image projection system and in particular, the arcuate elements and image relief microstructures may be formed from a variety of materials such as substantially transparent or clear, colored or colorless polymers such as acrylics, acrylated polyesters, acrylated urethanes, epoxies, polycarbonates, polypropylenes, polyesters, urethanes, and the like. High refractive index, colored or colorless materials having refractive indices (at 589 nanometers, 20° C.) of more than 1.5, 1.6, 1.7, or higher, such as those described in U.S. Pat. No. 8,557,369 to Hoffmuller et al., may also be used in the practice of the present invention.

The arcuate elements and image relief microstructures may also be formed from a composition that includes microparticulate reflective powder. As will be readily appreciated by those skilled in the art, the resulting system will be reflective without the need to add one or more reflective layers.

In addition to the exemplary embodiments described above, the image relief microstructures may also be formed by a patterned reflective (e.g., metal) coating that conforms to the upper arcuate surfaces. In this embodiment, the convex or concave upper arcuate surfaces are each provided with a reflective pattern of reflecting and non-reflecting zones.

Preferred methods and techniques for forming single layer image projection systems, which include the use of lasers, photolithography, etching, small scale 3D printing, machining, and the like, are mentioned above.

In an exemplary method of manufacture of the single layer image projection system of the present invention, a lens tool incorporating a repeating pattern of concave arcuate elements, such as those described in U.S. Pat. No. 7,333,268 to Steenblik et al., U.S. Pat. No. 7,468,842 to Steenblik et al., and U.S. Pat. No. 7,738,175 to Steenblik et al., is used. The lens tool is coated with a reflective metal and then the recesses or cups (i.e., areas defined by the arcuate image generating surfaces) of the lens tool are filled or partially filled with photoresist. A photomask incorporating a repeating pattern of image icons that coincide with the desired repeating pattern of image relief microstructures is positioned over the lens tool and then the photoresist in the recesses or cups is exposed through the photomask to collimated ultraviolet (UV) light. The image icons of the photomask block the UV light thereby causing shadows to form on the filled or partially filled, metalized recesses or cups. As a result, the concave arcuate elements are not cured or fully cured in these shadow regions, which cause depressions to form in the metalized surface. The resulting repeating pattern of concave arcuate elements with depressions (i.e., repeating pattern of image relief microstructures) produces optical effects, as described above, without the need to form a further embossed surface.

The optical effects achieved by these other contemplated embodiments are described above and also in U.S. Pat. No. 7,333,268 to Steenblik et al., U.S. Pat. No. 7,468,842 to Steenblik et al., and U.S. Pat. No. 7,738,175 to Steenblik et al. The optical effects include, but are not limited to, movement or motion including, but not limited to, orthoparallactic movement or motion, float, deep, levitate, morph and/or 3-D effects as the system is tilted or as the viewing angle changes. In particular, the inventive system may project one or more magnified moiré images that:

i. show movement as the system is tilted or viewed from different viewing angles;

ii. appear to lie on a spatial plane deeper than the thickness of the system;

iii. appear to lie on a spatial plane above a surface of the system;

iv. oscillate between a spatial plane deeper than the thickness of the system and a spatial plane above a surface of the system as the system is azimuthally rotated;

v. transform from one form, shape, size and/or color into a different form, shape, size and/or color as the system is either azimuthally rotated or viewed from different viewpoints; and/or vi. appear as a three-dimensional image(s).

The inventive single layer image projection system, which may be used alone or in combination with a multi-layer image projection system, may take any shape including, but not limited to, bands, strips, stripes, threads, or patches, and may be formed directly on a target surface or as a free-standing device for subsequent transfer to a target surface.

The inventive system as a free-standing device may be prepared by forming repeating patterns of arcuate elements and image relief microstructures out of a transparent material on a carrier film (or other substrate). The repeating upper arcuate surfaces and microstructures are then coated with metal (metallized). Because the original structure was transparent, both sides of this system or device will project images. An adhesive is applied over the metallized repeating upper arcuate surfaces resulting in a device that is ready to be transferred to a target surface. The adhesive is pressed to a target surface, and the adhesive activated to form a bond between the target surface and the device. The carrier film is peeled away, leaving behind a free-standing structure that has the following advantage: now the microstructures are encased in a clear material. This makes them more resilient to soiling and other detrimental environmental effects.

The thickness of the inventive system is not limited and can range from very thin (i.e., a couple of microns or perhaps even less) for micro-scale systems to very thick (i.e., inches, feet, etc.) for macro-scale systems.

The present invention further provides fibrous and non-fibrous (e.g., polymer) sheet materials that are made from or employ the inventive system, as well as documents made from these materials (e.g., paper and polymer currency). The term "documents", as used herein designates documents of any kind including documents having financial value, such as banknotes or currency, bonds, checks, traveler's checks, lottery tickets, postage stamps, stock certificates, title deeds and the like, identity documents, such as passports, ID cards, driving licenses and the like, and non-secure documents, such as labels. The inventive single layer image projection system is also contemplated for use with goods (consumer or non-consumer goods) as well as bags, packaging, or labels used with these goods.

Other contemplated end-use applications for the inventive system include products for projecting larger dimension images such as advertising and multimedia displays (e.g., billboards, traffic and industrial safety signs, commercial displays for marketing or tradeshow purposes), products for enhancing a vehicle's appearance (e.g., decal, wrap), decorative wrap and wallpaper, shower curtains, artistic displays, and the like.

The devices, systems, and methods of the appended claims are not limited in scope by the specific devices, systems, and methods described herein, which are intended as illustrations of a few aspects of the claims. Any devices, systems, and methods that are functionally equivalent are intended to fall within the scope of the claims. Various modifications of the devices, systems, and methods in addition to those shown and described herein are intended to fall within the scope of the appended claims. Further, while only certain representative devices, systems, and method steps disclosed herein are specifically described, other combinations of the devices, systems, and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

The invention claimed is:

1. A single layer image projection system for projecting one or more images that comprises an arrangement of optionally reflective arcuate elements having an upper arcuate surface, a lower surface, and an arcuate area bounded by the upper arcuate and lower surfaces, and an optionally reflective pattern of image relief microstructures disposed on or within at least some of the upper arcuate surfaces of the arcuate elements, wherein the arrangement of optionally reflective arcuate elements and the optionally reflective pattern of image relief microstructures are in a single layer and interact to project one or more images,
   wherein for an upper arcuate surface with convex surface curvature, the image relief microstructures extend downwardly from this surface terminating within the arcuate area, and
   wherein for an upper arcuate surface with concave surface curvature, the image relief microstructures extend upwardly from this surface terminating within an area defined by the curvature of the upper arcuate surface.

2. The single layer image projection system of claim 1, wherein the arrangement of optionally reflective arcuate elements and the optionally reflective pattern of image relief microstructures interact to project one or more magnified moiré images.

3. The single layer image projection system of claim 1, wherein the image relief microstructures are selected from the group consisting of (+)-relief image relief microstructures, (−)-relief image relief microstructures, and combinations thereof.

4. The single layer image projection system of claim 1, wherein the arrangement of optionally reflective arcuate elements and the optionally reflective pattern of image relief microstructures are reflective.

5. The single layer image projection system of claim 1, wherein the image relief microstructures are formed by a patterned reflective coating that conforms to the upper arcuate surfaces, wherein the upper arcuate surfaces are each provided with a reflective pattern of reflecting and non-reflecting zones.

6. The single layer image projection system of claim 1, wherein one or more upper arcuate surfaces are metalized to form one or more metalized zones, while one or more upper arcuate surfaces are left unmetalized to form one or more non-metalized zones, wherein the one or more projected images are apparent in the one or more metalized zones, but less apparent in the one or more non-metalized zones.

7. The single layer image projection system of claim 1, which is combined with a multi-layer image projection system comprising an arrangement of focusing elements and an arrangement of image icons, which interact to project one or more images.

8. The single layer image projection system of claim 7, wherein voids or depressions are incorporated into the focusing elements of the multi-layer image projection system, wherein the voids or depressions form one or more covert images which are not apparent when the system is viewed using a point light source.

9. The single layer image projection system of claim 1, wherein the image relief microstructures have sidewalls and either an upper or lower horizontal surface.

10. The single layer image projection system of claim 9, wherein the upper or lower horizontal surface is uneven or irregular.

11. The single layer image projection system of claim 1, wherein the image relief microstructures have sidewalls and either an upper or lower curved surface, wherein the upper or lower curved surface is parallel to the upper arcuate surfaces.

12. The single layer image projection system of claim 11, wherein the upper or lower curved surface is uneven or irregular.

13. The single layer image projection system of claim 1, wherein the upper arcuate surfaces are shaped like domes approximating full hemispheres.

14. The single layer image projection system of claim 1, wherein the upper arcuate surfaces are shaped like partial domes approximating partial hemispheres.

15. A single layer image projection system for projecting one or more images that comprises an arrangement of optionally reflective arcuate elements having an upper arcuate surface, a lower surface, and an arcuate area bounded by the upper arcuate and lower surfaces, and an optionally reflective pattern of image relief microstructures disposed on or within at least some of the upper arcuate surfaces of the arcuate elements, wherein the arrangement of optionally reflective arcuate elements and the optionally reflective pattern of image relief microstructures are in a single layer and interact to project one or more images,
   wherein for an upper arcuate surface with convex surface curvature, the image relief microstructures extend downwardly from this surface terminating within the arcuate area, and wherein for an upper arcuate surface with concave surface curvature, the image relief microstructures extend upwardly from this surface terminating within an area defined by the curvature of the upper arcuate surface,
wherein the arrangement of optionally reflective arcuate elements and the optionally reflective pattern of image relief microstructures interact to project one or more magnified moiré images,
wherein the one or more magnified moiré images:
  i. show movement as the system is tilted or viewed from different viewing angles;
  ii. appear to lie on a spatial plane deeper than the thickness of the system;
  iii. appear to lie on a spatial plane above a surface of the system;
  iv. oscillate between a spatial plane deeper than the thickness of the system and a spatial plane above a surface of the system as the system is azimuthally rotated;
  v. transform from one form, shape, size and/or color into a different form, shape, size and/or color as the system is either azimuthally rotated or viewed from different viewpoints; and/or
  vi. appear as a three-dimensional image(s).

16. A sheet material having opposing surfaces and comprising at least one single layer image projection system of claim 1 that is either mounted on, or partially embedded within, a surface of the sheet material, or partially embedded within the sheet material.

17. A sheet material prepared from the single layer image projection system of claim 1.

18. A document prepared from the sheet material of claim 16.

19. A document prepared from the sheet material of claim 17.

20. A consumer or non-consumer good which has at least one single layer image projection system of claim 1 that is either (a) mounted on, or embedded within, a surface of the good, or bags, packaging, or labels used with the good, or (b) partially embedded within the good, or bags, packaging, or labels used with the good.

21. A product for projecting large dimension images that comprises at least one single layer image projection system of claim 1; mounted on, or embedded within, a surface thereof, wherein the product is selected from the group of advertising and multimedia displays, products for enhancing a vehicle's appearance, decorative wrap, wallpaper, shower curtains, and artistic displays.

22. A moiré magnification system comprising (a) a surface; and (b) a periodic array of image relief microstructures having a periodic surface curvature disposed on or within the surface, wherein the image relief microstructures have a first image repeat period along a first image reference axis within the array, wherein the periodic surface curvature has a first curvature repeat period along a first curvature reference axis within the array, and wherein transmission of light through the array, reflection of light from the array, or combinations thereof forms a magnified moiré image.

23. The system of claim 22, wherein the periodic surface curvature is convex.

24. The system of claim 22, wherein image relief microstructures upwardly project from the surface terminating in an arcuate image generating surface.

25. The system of claim 22, wherein the image relief microstructures comprise voids formed within the surface terminating in an arcuate image generating surface.

26. The system of claim 22, wherein the ratio of the first image repeat period to the first curvature repeat period is 1.

27. The system of claim 22, wherein the ratio of the first image repeat period to the first curvature repeat period is less than 1.

28. The system of claim 22, wherein the ratio of the first image repeat period to the first curvature repeat period is greater than 1.

29. The system of claim 22, wherein the periodic surface curvature is skewed relative to the image relief microstructures, such that the first curvature reference axis is not parallel to or coincident with the first image reference axis.

30. The system of claim 29, wherein the magnified moiré image appears to slide counter-directionally within a plane parallel to or coplanar with the surface upon rotation of the system about an axis parallel to the surface.

31. The system of claim 22, wherein the first image repeat period is from 1 micron to 1000 microns and the first curvature repeat period is from 1 micron to 1000 microns.

32. The system of claim 22, wherein the periodic surface curvature exhibits a radius of curvature of from 1 micron to 500 microns.

33. The system of claim 22, wherein the magnified moiré image further appears to lie on a spatial plane beneath the system.

34. The system of claim 22, wherein the magnified moiré image further appears to lie on a spatial plane above the system.

35. The system of claim 22, wherein the magnified moiré image further appears to move between a spatial plane beneath the system and a spatial plane above the system upon rotation of the system about an axis perpendicular to the surface.

36. The system of claim 22, wherein the magnified moiré image further appears to transform from a first form, shape, size or color to a second form, shape, size or color upon rotation of the system about an axis parallel to the surface.

37. The system of claim 22, applied to or formed on an article or packaging for the article.

38. The system of claim 37, wherein the article comprises a document selected from the group consisting of banknotes, checks, money orders, passports, visas, vital records, identification cards, credit cards, ATM cards, licenses, tax stamps, postage stamps, lottery tickets, deeds, titles, certificates, and legal documents.

39. A hard or soft embossing master comprising the system of claim 22.

40. A method of making the system of claim 22, comprising forming a periodic array of image relief microstructures having a periodic surface curvature on or within a surface.

41. The method of claim 40, wherein the periodic array of image relief microstructures is formed by embossing, casting, molding, or stamping.

* * * * *